US012232507B2

(12) United States Patent
Asami et al.

(10) Patent No.: US 12,232,507 B2
(45) Date of Patent: Feb. 25, 2025

(54) COFFEE BEVERAGE HAVING IMPROVED QUALITY OF TASTE EXHIBITED BY SUGAR, SWEETENER, AND SODIUM

(71) Applicant: SUNTORY HOLDINGS LIMITED, Osaka (JP)

(72) Inventors: Yoji Asami, Kanagawa (JP); Tadahiro Ohkuri, Kanagawa (JP); Akiko Fujie, Kanagawa (JP); Koji Nagao, Kanagawa (JP); Yoshiaki Yokoo, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 420 days.

(21) Appl. No.: 17/299,833

(22) PCT Filed: Dec. 6, 2019

(86) PCT No.: PCT/JP2019/047914
§ 371 (c)(1),
(2) Date: Jun. 4, 2021

(87) PCT Pub. No.: WO2020/116637
PCT Pub. Date: Jun. 11, 2020

(65) Prior Publication Data
US 2022/0022480 A1 Jan. 27, 2022

(30) Foreign Application Priority Data
Dec. 7, 2018 (JP) .................. 2018-230399

(51) Int. Cl.
*A23F 5/28* (2006.01)
*A23F 5/24* (2006.01)

(52) U.S. Cl.
CPC ................ *A23F 5/28* (2013.01); *A23F 5/243* (2013.01)

(58) Field of Classification Search
None
See application file for complete search history.

(56) References Cited

U.S. PATENT DOCUMENTS

| | | | |
|---|---|---|---|
| 5,433,965 A | 7/1995 | Fischer et al. | |
| 7,229,658 B1 | 6/2007 | Inoue et al. | |
| 9,044,038 B2 | 6/2015 | Yoshinaka et al. | |
| 9,144,251 B2 | 9/2015 | Prakash et al. | |
| 2007/0116823 A1 | 5/2007 | Prakash et al. | |
| 2007/0116832 A1 | 5/2007 | Prakash et al. | |
| 2007/0116833 A1 | 5/2007 | Prakash et al. | |
| 2007/0128311 A1 | 6/2007 | Prakash et al. | |
| 2008/0226770 A1 | 9/2008 | Lee et al. | |
| 2008/0226773 A1 | 9/2008 | Lee | |
| 2008/0226803 A1 | 9/2008 | Letourneau et al. | |
| 2008/0226804 A1* | 9/2008 | Talebi | A23L 2/68 426/599 |
| 2009/0053378 A1 | 2/2009 | Prakash et al. | |
| 2009/0311686 A1 | 12/2009 | Slack et al. | |
| 2010/0196549 A1 | 8/2010 | Rivera et al. | |
| 2010/0267847 A1 | 10/2010 | Yoshinaka et al. | |
| 2011/0129590 A1 | 6/2011 | Deibler et al. | |
| 2011/0160311 A1 | 6/2011 | Prakash et al. | |
| 2011/0200712 A1 | 8/2011 | Takaichi et al. | |
| 2012/0076908 A1 | 3/2012 | Fujihara et al. | |
| 2012/0156351 A1 | 6/2012 | Miyazawa et al. | |
| 2012/0189739 A1 | 7/2012 | Rathke et al. | |
| 2012/0214751 A1 | 8/2012 | Markosyan | |
| 2012/0263826 A1 | 10/2012 | Fang et al. | |
| 2013/0045297 A1 | 2/2013 | Knight | |
| 2014/0037814 A1 | 2/2014 | Quinlan et al. | |
| 2014/0248411 A1 | 9/2014 | Rhyu et al. | |
| 2014/0255371 A1 | 9/2014 | Roberts et al. | |
| 2014/0322389 A1 | 10/2014 | Prakash et al. | |
| 2014/0342043 A1 | 11/2014 | Bell et al. | |
| 2014/0342044 A1 | 11/2014 | Bell et al. | |
| 2015/0018432 A1 | 1/2015 | Prakash et al. | |
| 2015/0110940 A1 | 4/2015 | Lee et al. | |
| 2015/0174162 A1 | 6/2015 | Bartolozzi et al. | |
| 2015/0223510 A1 | 8/2015 | Lee et al. | |
| 2015/0230509 A1 | 8/2015 | Fujihara et al. | |
| 2016/0095338 A1 | 4/2016 | Mao et al. | |
| 2016/0183574 A1 | 6/2016 | Chen et al. | |
| 2017/0006889 A1 | 1/2017 | Ishimori et al. | |
| 2017/0055554 A1 | 3/2017 | Suzuri et al. | |
| 2017/0105432 A1 | 4/2017 | Karanewksy et al. | |
| 2017/0119032 A1 | 5/2017 | Patron et al. | |
| 2017/0196242 A1 | 7/2017 | Koike et al. | |
| 2017/0215458 A1 | 8/2017 | Urai et al. | |
| 2017/0245537 A1 | 8/2017 | Lee et al. | |
| 2017/0273338 A1 | 9/2017 | Lee et al. | |
| 2017/0280751 A1 | 10/2017 | Baier et al. | |

(Continued)

FOREIGN PATENT DOCUMENTS

| | | | |
|---|---|---|---|
| CN | 101309598 A | 11/2008 | |
| CN | 101340827 A | 1/2009 | |

(Continued)

OTHER PUBLICATIONS

CN106720817, Wang (machine translation) (Year: 2016).*
Kagawa, Yoshiko Seventh reviesed edition, Food Ingredient Table 2016. pp. 210-2013 with translation of Coffee/Cocoa and Green Tea entries.*
Extended European Search Report issued in EP Patent Application No. 19892748.5, dated Jul. 20, 2022.
Extended European Search Report issued in EP Patent Application No. 19892252.8, dated Jul. 27, 2022.
Extended European Search Report issued in EP Patent Application No. 19893157.8, dated Jul. 20, 2022.
Extended European Search Report issued in EP Patent Application No. 19894071.0, dated Sep. 16, 2022.

(Continued)

*Primary Examiner* — Anthony J Weier
(74) *Attorney, Agent, or Firm* — GREENBLUM & BERNSTEIN, P.L.C.

(57) ABSTRACT

The present invention pertains to a coffee beverage having improved taste quality exhibited by a sugar, a sweetener, and amount of sodium and a method for producing the coffee beverage.

19 Claims, No Drawings

(56) References Cited

U.S. PATENT DOCUMENTS

| | | |
|---|---|---|
| 2017/0349620 A1 | 12/2017 | Prakash et al. |
| 2017/0354175 A1 | 12/2017 | Karanewsky et al. |
| 2018/0000133 A1 | 1/2018 | Izumi et al. |
| 2018/0049455 A1 | 2/2018 | Morita et al. |
| 2018/0079767 A1 | 3/2018 | Markosyan et al. |
| 2018/0116976 A1 | 5/2018 | Westphal et al. |
| 2018/0184692 A1 | 7/2018 | Nachbagauer et al. |
| 2018/0230504 A1 | 8/2018 | Anderson et al. |
| 2018/0263269 A1 | 9/2018 | Prakash et al. |
| 2019/0174806 A1 | 6/2019 | Erickson et al. |
| 2019/0183148 A1 | 6/2019 | Nakajima et al. |
| 2019/0208803 A1 | 7/2019 | Browne et al. |
| 2020/0107568 A1 | 4/2020 | Matsuzaki et al. |
| 2020/0205451 A1 | 7/2020 | Ohkuri et al. |
| 2021/0329948 A1 | 10/2021 | Asami et al. |
| 2021/0337823 A1 | 11/2021 | Asami et al. |
| 2022/0015384 A1 | 1/2022 | Asami et al. |
| 2022/0015396 A1 | 1/2022 | Asami et al. |
| 2022/0022494 A1 | 1/2022 | Asami et al. |
| 2022/0071238 A1 | 3/2022 | Asami et al. |
| 2022/0071239 A1 | 3/2022 | Asami et al. |
| 2022/0125076 A1 | 4/2022 | Asami et al. |
| 2022/0159988 A1 | 5/2022 | Asami et al. |

FOREIGN PATENT DOCUMENTS

| | | |
|---|---|---|
| CN | 101662944 A | 3/2010 |
| CN | 101662954 A | 3/2010 |
| CN | 101662958 A | 3/2010 |
| CN | 103564379 A | 2/2014 |
| CN | 106720817 | 5/2017 |
| JP | 55-127972 | 10/1980 |
| JP | 58-152466 | 9/1983 |
| JP | 59-183670 | 10/1984 |
| JP | H8-508638 | 9/1996 |
| JP | 2000-197463 A | 7/2000 |
| JP | 2000-300190 | 10/2000 |
| JP | 2002-034501 | 2/2002 |
| JP | 2003-210147 | 7/2003 |
| JP | 2008-017834 | 1/2008 |
| JP | 2009-517030 | 4/2009 |
| JP | 2010-507376 | 3/2010 |
| JP | 2010-521164 | 6/2010 |
| JP | 2011-520452 | 7/2011 |
| JP | 2011-254783 | 12/2011 |
| JP | 2012-70708 | 4/2012 |
| JP | 2012-235790 | 12/2012 |
| JP | 2013-34483 A | 2/2013 |
| JP | 2013-039068 | 2/2013 |
| JP | 2013-507914 | 3/2013 |
| JP | 2014-082960 | 5/2014 |
| JP | 2014-93980 | 5/2014 |
| JP | 2014-236680 | 12/2014 |
| JP | 2014-532404 | 12/2014 |
| JP | 2015-23803 | 2/2015 |
| JP | 2015-033387 | 2/2015 |
| JP | 2015-512652 | 4/2015 |
| JP | 2015-096057 | 5/2015 |
| JP | 2015-130875 A | 7/2015 |
| JP | 2015-523099 | 8/2015 |
| JP | 2016-54651 | 4/2016 |
| JP | 2016-518143 | 6/2016 |
| JP | 2016-521974 | 7/2016 |
| JP | 2016-529878 | 9/2016 |
| JP | 2016-178928 | 10/2016 |
| JP | 6109353 | 4/2017 |
| JP | 2017-532027 | 11/2017 |
| JP | 2017-535251 | 11/2017 |
| JP | 2018-130097 | 8/2018 |
| JP | 2018-521680 | 8/2018 |
| JP | 2018-530326 | 10/2018 |
| TW | 200738172 A | 10/2007 |
| WO | 2000/24273 | 5/2000 |
| WO | 2009/063921 | 5/2009 |
| WO | 2009/063921 A1 | 5/2009 |
| WO | 2009/140568 | 11/2009 |
| WO | 2010/050510 | 5/2010 |
| WO | 2011/024471 | 3/2011 |
| WO | 2011/046423 | 4/2011 |
| WO | 2016/054544 | 4/2016 |
| WO | 2016/143361 | 9/2016 |
| WO | 2017/170990 | 10/2017 |
| WO | 2018/044588 | 3/2018 |
| WO | 2018/053135 | 3/2018 |
| WO | 2018/122383 | 7/2018 |
| WO | 2018/186352 | 10/2018 |
| WO | 2018/225817 | 12/2018 |

OTHER PUBLICATIONS

Extended European Search Report issued in EP Patent Application No. 19892254.4, dated Sep. 9, 2022.
Extended European Search Report issued in EP Patent Application No. 19894000.9, dated Sep. 16, 2022.
Extended European Search Report issued in EP Patent Application No. 19893665.0, dated Sep. 16, 2022.
Extended European Search Report issued in EP Patent Application No. 19892656.0, dated Sep. 12, 2022.
Database GNPD [Online] MINTEL; Nov. 6, 2017 (Nov. 6, 2017), anonymous: "Creme Bruleé Milk Tea", XP055937246, Database accession No. 5224533.
Database GNPD [Online] MINTEL; Apr. 5, 2018 (Apr. 5, 2018), anonymous: "Mixed Berry Tea", XP055938844, Database accession No. 5579997.
Database GNPD [Online] Mintel; Oct. 25, 2018 (Oct. 25, 2018), anonymous: "Lime Flavored Black Ice Tea", XP055938854, Database accession No. 6075033.
Database GNPD [Online] Mintel; Jun. 18, 2015 (Jun. 18, 2015), anonymous: "Acerola Drink", XP055940391, Database accession No. 3274363.
Database GNPD [Online] Mintel; Oct. 2, 2018 (Oct. 2, 2018), anonymous: "Lemon Ginger 360° Cleanse Cold-Press Almond Juice", XP055940404, Database accession No. 6006827.
Third Party Observations (Filed: Jun. 2, 2022) in JP Patent Application No. 2020-560054, along with a machine English language translation.
Third Party Observations (Filed: Jun. 2, 2022) in JP Patent Application No. 2020-560061, along with a machine English language translation.
Third Party Observations (Filed: Aug. 3, 2022) in JP Patent Application No. 2020-560069, along with a machine English language translation.
Third Party Observations (Filed: Sep. 16, 2022) in JP Patent Application No. 2020-560069, along with a machine English language translation.
Third Party Observations (Filed: Aug. 3, 2022) in JP Patent Application No. 2020-560071, along with a machine English language translation.
Third Party Observations (Filed: Aug. 2, 2022) in JP Patent Application No. 2020-560061, along with a machine English language translation.
Third Party Observations (Filed: Aug. 3, 2022) in JP Patent Application No. 2020-560062, along with a machine English language translation.
Third Party Observations (Filed: Aug. 1, 2022) in JP Patent Application No. 2020-560068, along with a machine English language translation.
Kamiwaki et al., "Anions, Cations and Silica in Commercial Mineral Water Products, City Waters and Well Waters," Nippon Shokuhin Kogyo Gakkaishi vol. 39, No. 5, 432-438 (1992), including English language Abstract.
Application of the plant-derived sweetener "Sannature" series in the field of beverages, Beverage Japan, No. 443, pp. 46-48, Dec. 2018, along with a partial English language translation.
Fernstrom et al., "Mechanisms for Sweetness", The Journal of Nutrition, 2012, vol. 142: 1134S-1141S.
Li et al. "Human receptors for sweet and umami taste", Proc Natl Acad Sci U S A. 2002, 99(7):4692-4696.

(56) References Cited

OTHER PUBLICATIONS

Uchida et al. "Studies on Interaction with Sweet and Salty Taste", Research Bulletin of Otsuma Women's University for Home Economics, No. 49 (2013) (w/ English-language summary on last page).
Zhao et al., "The Receptors for Mammalian Sweet and Umami taste", Cell, 2003, vol. 115, 255-266.
Hutteau et al., "Physicochemical and Psychophysical Characteristics of Binary Mixtures of Bulk and Intense Sweeteners", Food Chemistry, 1998, vol. 63, No. 1, pp. 9-16.
Kawai et al., "Evaluation of synergetic effects among sweeteners by mice brief-access tests", The Japanese Journal of Taste and Smell Research, 2014, 21(3):285-288 (w/ translation).
Okuri et al., "Enhancement of the chorda tympani nerve responses to mixtures of sweet and salt compounds in mice" The Japanese Journal of Taste and Smell Research, 2009, vol. 16, No. 3, pp. 327-330 (w/ translation).
Schiffman et al., "Investigation of Synergism in Binary Mixtures of Sweeteners", Brain Research Bulletin, 1995, vol. 38, No. 2, pp. 105-120.
Sinchaipanit et al., "Effect of sweeteners and hydrocolloids on quality attributes of reduced-calorie carrot juice", Journal of the Science of Food and Agriculture, 2013, vol. 93, pp. 3304-3311.
Yee et al., "Glucose transporters and ATP-gated K+ ($K_{ATP}$) metabolic sensors are present in type 1 taste receptor 3 (T1r3)-expressing taste cells", Proc Natl Acad Sci USA, 2011, vol. 108, No. 13, 5431-5436.
Lemon & Grapefruit Sparkling Water, Mintel (ID#4066849), retrieved from www.gnpd.com.
Jiang et al., "The Cysteine-rich Region of T1R3 Determines Responses to Intensely Sweet Proteins", J Biol Chem. 2004, vol. 279, No. 43, 45068-45075.
Mixed Berry Carbonated Vitamin Drink, Mintel (ID#5773819), retrieved from www.gnpd.com.
Concord Grape Juice, Mintel (ID#1827674), retrieved from www.gnpd.com.
Watermelon Pasteque Natural Fruit Drink, Mintel (ID#2309617), retrieved from www.gnpd.com.
White Grape Pulse, Mintel (ID#1662293), retrieved from www.gnpd.com.
Foxy Fruit Punch, Mintel (ID#1207728), retrieved from www.gnpd.com.
"How to best deal with soft drinks" linked to "Karada kenkoujyuku", Nikkyo Create, "Amount of sugar contained in soft drinks", Aug. 2015, retrieved on Jan. 29, 2020 from http://www.nikkyocreate.co.jp/kkj/ (including partial translation).
Cassis & Orange Water, Mintel (ID#5800663), retrieved from www.gnpd.com.
Office Action dated Feb. 4, 2023, issued in Chinese patent application No. 201980080710.0, with English machine translation thereof.
Office Action dated Apr. 5, 2023, issued in Chinese patent application No. 201980080670, with English machine translation thereof.
Nagai, Terukazu, "Properties and functions on gluconic acid and its salt," Honeybee Science, 2001, 22(4) pp. 171-174, with English abstract; cited in Office Actions issued in Japanese application Nos. 2020-560055, 2020-560062, 2020-560069, and 2020-560071.
Office Action dated May 10, 2023, issued in Japanese patent application No. 2020-560055, with English machine translation thereof.
Office Action dated May 10, 2023, issued in Japanese patent application No. 2020-560062, with English machine translation thereof.
Office Action dated May 10, 2023, issued in Japanese patent application No. 2020-560069, with English machine translation thereof.
Office Action dated May 10, 2023, issued in Japanese patent application No. 2020-560071, with English machine translation thereof.
Office Action dated Apr. 18, 2023, issued in Chinese patent application No. 201980080664.4, with English machine translation thereof.
Office Action dated May 12, 2023, issued in Japanese patent application No. 2020-560054, with English machine translation thereof.
Office Action dated May 12, 2023, issued in Japanese patent application No. 2020-560061, with English machine translation.
Standard Tables of Food Composition in Japan—2015—(Seventh Revised Edition) Update: Dec. 27, 2017, Table: Standard tables of food composition (Proximates, minerals and vitamins, etc.) http://www.mext.go.jp/component/a_menu/science/detail/_iesFiles/afieldfile/2016/01/15/1365343_1-0207r2_1.pdf, with English machine translation thereof; cited in Office Actions issued in Japanese application Nos. 2020-560054 and 2020-560061.
Ueda, Mikio, *New Food Industry*, 2005, vol. 47, No. 3, pp. 45-54, with partial English machine translation; cited in Office Actions issued in Japanese application Nos. 2020-560054 and 2020-560061.
Office Action dated Oct. 13, 2023 in U.S. Appl. No. 17/299,981.
Office Action dated Oct. 18, 2023 in U.S. Appl. No. 17/299,868.
Office Action dated Oct. 27, 2023 in Chinese patent application No. 201980080262.4, with machine translation thereof.
Office Action dated Nov. 9, 2023 in Chinese patent application No. 201980080662.5, with machine translation thereof.
Office Action dated Oct. 31, 2023 in Chinese patent application No. 201980080719.1, with machine translation thereof.
Deis, Ronald, "Customizing Sweetness Profiles," Food Product Design, vol. 15, No. 11, Nov. 2006.
Restriction Requirement dated Jan. 18, 2024 in U.S. Appl. No. 17/299,858.
Handbook of China Food Additives and Ingredients Information Sheet and p. 369, with partial English machine translation.
Apple Flavored Fortifed Water, Mintel (ID# 1538195), retrieved from www.gnpd.com.
Ito, Hiroshi, "Caffeine, A glossary of C0ffee", Shibatashoten Co., Ltd. (w/ partial translation).
Taguchi et al., "Seasoning Effect on Various Combinations of Basic Taste Qualities at Concentration Levels Used in Cooking", Journal of Nagoya Bunri College, 1988, 13:1-15 (w/ partial translation).
Watanabe, Yuko, "Applied technology by the combined use of erythritol and high-intensity sweeteners", Food Chemicals, 2000, 16(5):41-45 (w/ partial translation).
International Search Report issued in PCT/JP2019/047863, dated Mar. 10, 2020.
Written Opinion of the International Searching Authority issued in PCT/JP2019/047863, dated Mar. 10, 2020.
International Search Report issued in PCT/JP2019/047914, dated Mar. 10, 2020.
Written Opinion of the International Searching Authority issued in PCT/JP2019/047914, dated Mar. 10, 2020.
International Search Report issued in PCT/JP2019/047865, dated Mar. 10, 2020.
Written Opinion of the International Searching Authority issued in PCT/JP2019/047865, dated Mar. 10, 2020.
International Search Report issued in PCT/JP2019/047916, dated Feb. 25, 2020.
Written Opinion of the International Searching Authority issued in PCT/JP2019/047916, dated Feb. 25, 2020.
International Search Report issued in PCT/JP2019/047866, dated Feb. 25, 2020.
Written Opinion of the International Searching Authority issued in PCT/JP2019/047866, dated Feb. 25, 2020.
International Search Report issued in PCT/JP2019/047915, dated Mar. 3, 2020.
Written Opinion of the International Searching Authority issued in PCT/JP2019/047915, dated Mar. 3, 2020.
International Search Report issued in PCT/JP2019/047868, dated Feb. 25, 2020.
Written Opinion of the International Searching Authority issued in PCT/JP2019/047868, dated Feb. 25, 2020.
International Search Report issued in PCT/JP2019/047895, dated Mar. 10, 2020.
Written Opinion of the International Searching Authority issued in PCT/JP2019/047895, dated Mar. 10, 2020.
International Search Report issued in PCT/JP2019/047918, dated Feb. 10, 2020.

(56) References Cited

OTHER PUBLICATIONS

Written Opinion of the International Searching Authority issued in PCT/JP2019/047918, dated Feb. 10, 2020.
International Search Report issued in PCT/JP2019/047897, dated Feb. 10, 2020.
Written Opinion of the International Searching Authority issued in PCT/JP2019/047897, dated Feb. 10, 2020.
Office Action issued Feb. 29, 2024 in U.S. Appl. No. 17/299,868.
Office Action issued Mar. 20, 2024 in U.S. Appl. No. 17/299,981, Jun. 30, 2016.
Handbook of China Food Additives and Ingredients Information Sheet and p. 369, with partial English machine translation. Jun. 30, 2016.
Decision of Rejection issued Mar. 19, 2024 in Chinese patent application No. 201980080666.3, with English machine translation.
Office Action issued May 17, 2024 in U.S. Appl. No. 17/299,868.
Office Action issued Mar. 20, 2024 in U.S. Appl. No. 17/299,981.
Apple Flavored Fortified Water, Mintel (ID#1538195), retrieved from www.gnpd.com.
Coconut Water, Mintel (ID#1754174), retrieved from www.gnpd.com.
Research report "Sugar and energy of the flavor water" published by FCG Research Institute, Inc., Mar. 16, 2015, captured on Jan. 29, 2020 from Wayback Machine internet archive: http://web.archive.org/web/20150316181104/https://www.fcg-r.co.jp/lab/foods/report/130607.html (w/ partial translation).
"Flavored Water List" in "Sugar and energy of the flavor water" published by FCG Research Institute, Inc., Mar. 16, 2015, captured on Jan. 29, 2020 from Wayback Machine internet archive: http://web.archive.org/web/20150414002447/http://www.fcg-r.co.jp/lab/foods/report/images/20130607-2.pdf (w/ partial translation).
Ito, Hiroshi, "Caffeine, A glossary of Coffee", Shitbatashoten Co., Ltd. (w/ partial translation).
Lemon & Orange Water, Mintel (ID#3247301), retrieved from www.gnpd.com.
Raspberry, Guava and Jack Fruit Flavored Water, Mintel (ID#4933725), retrieved from www.gnpd.com.
Organic Coconut Aloe Water, Mintel (ID#2553315), retrieved from www.gnpd.com.
Blueberry-Lime Organic ALoe and Coconut Water Beverage, Mintel (ID#4793439), retrieved from www.gnpd.com.
FFI Journal, vol. 223, No. 1, 2018. pp. 78-83, with partial English translation thereof.
Jafan, vol. 29, No. 6, (2010), pp. 355-362, with partial English translation thereof.
Ohta et al., "Characterization of Novel Steviol Glycosides from Leaves of *Stevia rebaudiana* Morita," J. Appl. Glycosci., vol. 57, 99. 199-209 (2010).
Search results for "coffee/infusion" in Food component database (https://fooddb.mext.go.jp/), 2023, with partial English translation thereof.
Search results for "normal milk, skimmed milk, dried whole milk" in food component database (https://fooddb.mext.go.jp/), 2023, with partial English translation thereof.
Beverage Japan, No. 204 (1998, Dec.), pp. 55-57, with partial English translation thereof.
Beverage Japan, No. 215 (1999, Nov.), pp. 75-76, with partial English translation thereof.
Bulletin of Tokyo University and Graduate School of Social Welfare, vol. 6, No. 2, pp. 109-125 (2016), with partial English translation thereof.
Mintel GNPD data Café au Lait & Deli, Record No. 4781627, Apr. 2017.
Mintel GNPD data, Creamy Caféau Lait, Record No. 2792269, Nov. 2014.
Eighth edition of practical guide of Japan's Specification and Standards for Food Additives, 2007, D-1014-1022, with partial English translation thereof.
Opposition Brief dated Nov. 15, 2024 for JP7486432B, with English machine translation thereof.
Opposition Brief dated Nov. 15, 2024 for JP7486433B, with English machine translation thereof.
Office Action issued on Dec. 10, 2024 in U.S. Appl. No. 17/299,839.
Quora, "How to convert ppm to mg per liter?" Aug. 17, https://www.quora/com/How-can-I-convert-ppm-to-mg-per-liter (Year: 2024).

\* cited by examiner

COFFEE BEVERAGE HAVING IMPROVED QUALITY OF TASTE EXHIBITED BY SUGAR, SWEETENER, AND SODIUM

TECHNICAL FIELD

The present invention relates to a coffee beverage having improved quality of taste exhibited by a sugar and a sweetener and a method for producing the coffee beverage.

BACKGROUND ART

Humans have five sensory systems, and the sense of taste is one of the sensory systems of humans. The taste receptor organ to receive tastes is called taste buds, which exist on the fungiform papillae existing over a wide area, mainly on the tip of the tongue, on the vallate papillae existing on a limited area of the back of the tongue, and on the foliate papillae. The taste buds are a cell assembly composed of elongate cells, called taste cells, and basal cells. The taste cells protrude microvilli toward the tongue surface, and form synapses at bottom of the cells with taste nerve fibers entering the taste buds. Tastes we usually sense are transmitted as taste information via the taste nerves to the brain, where the tastes are perceived. Known taste receptors of sweetness include T1R2 and T1R3. T1R2 and T1R3 are reported to form hetero-dimers (Non-patent Literatures 1 to 3).

Although various studies have been made on the sense of taste, little has been revealed yet in this field. We usually experience various tastes of foods. Foods that seem to be tasty have appropriately mixed and well-harmonized tastes. The taste of foods may be tasted as a single taste in some cases, but is often tasted as a mixed taste of various tastes, which are associated with one another.

Meanwhile, foods have been required to have lower calories in addition to a good taste in recent years. This relates to a fact that lifestyle-related diseases such as obesity and diabetes are regarded as a problem.

However, to produce lower-calorie foods, their natural sugar concentration has to be maintained low. This is an obstruction in the case of providing foods that exhibit low calories and a good taste.

As an example of a contrast effect, which is an interaction of tastes, there has been long known a phenomenon in which addition of salt to sweet red-bean soup enhances sweetness. There is an example that reports the interaction between saltiness and sweetness by focusing on this phenomenon, and it is concluded that the interaction between sweetness and saltiness requires sweetness that is strong to a certain degree (a 15% solution) and a salt concentration that is high to a certain degree (0.1 to 0.2%) (Non Patent Literature 4).

In addition, foods and drinks that exhibit sweetness by using a high-intensity sweetener of low calorie, such as Rebaudioside A, as a substitute for a natural sugar have also been developed, but the sweetness exhibited by a high-intensity sweetener has distinctive aftertaste, which hinders the provision of good taste.

CITATION LIST

Non Patent Literature

[Non Patent Literature 1] Zhao G. Q., Zhang Y., Hoon M. A., Chandrashekar J., Erlenbach I., Ryba N. J. P., and Zukerl C. S., Cell, 2003, Vol. 115, 255-266

[Non Patent Literature 2] Li X, Staszewski L, Xu H, Durick K, Zoller M, Adler E., Proc Natl Acad Sci USA. 2002, 99(7), 4692-4696.

[Non Patent Literature 3] Fernstrom J. D., Munger S. D., Sclafani A., de Araujo I. E., Roberts A., and Molinary S., J. Nutr. 2012. Vol. 142: 1134S-1141S

[Non Patent Literature 4] Ayumi Uchida, Nao Takagi, Rieko Horikiri, Miho Matsue, Yumiko Uchiyama and Masashi Omori, Research Bulletin of Otsuma Women's University for Home Economics—No. 49 (2013. 3)

SUMMARY OF INVENTION

Problem to be Solved by the Invention

The development of a method for well improving the taste quality exhibited by a sugar and a sweetener while having an adequate sweetness intensity and maintaining the amount of the natural sugar used in a coffee beverage low has been much awaited.

Means for Solving the Problems

The present inventors succeeded for the first time in increasing the sweetness based on the use of a natural sugar and a specific high-intensity sweetener in combination and improving the taste quality by containing not only a natural sugar but also a specific high-intensity sweetener and adding sodium in a low concentration.

That is, the present invention is as follows.

[1] A coffee beverage comprising:
 (a) a natural sugar in an amount corresponding to a sweetness intensity X1;
 (b) a high-intensity sweetener in an amount corresponding to a sweetness intensity X2; and
 (c) 5 mg/100 ml to 90 mg/100 ml of sodium,
 wherein the high-intensity sweetener comprises at least one high-intensity sweetener b1 selected from the group consisting of rebaudioside M, rebaudioside D, rebaudioside N, rebaudioside O, rebaudioside E, a Luo han guo extract, mogroside V, and thaumatin; and
 $0.1 < (X1+X2) \leq 20$ is satisfied.

[2] The coffee beverage according to [1], wherein a sodium content is 25 to 60 mg/100 ml.

[3] The coffee beverage according to [1] or [2], wherein energy is 50 Kcal/100 ml or less.

[4] The coffee beverage according to any of [1] to [3], wherein X1 is 0.1 to 5.9.

[5] The coffee beverage according to any of [1] to [4], comprising 40 mg/100 ml to 100 mg/100 ml of caffeine.

[6] The coffee beverage according to any of [1] to [5], wherein the natural sugar is at least one selected from the group consisting of glucose, sucrose, fructose, maltose, oligosaccharide, high-fructose corn syrup, lactose, psicose, allose, tagatose, and a combination thereof.

[7] The coffee beverage according to any of [1] to [6], wherein the high-intensity sweetener is at least one selected from the group consisting of rebaudioside M, rebaudioside D, a Luo han guo extract, mogroside V, and a combination thereof.

[8] The coffee beverage according to any of [1] to [7], wherein the sodium is at least one selected from the group consisting of sodium chloride, sodium hydroxide, sodium malate, sodium sulfate, sodium citrate, sodium phosphate, sodium carbonate, sodium disulfide, sodium bicarbonate, sodium alginate, sodium argininate, sodium glucoheptanoate, sodium gluconate, sodium glutamate, sodium tartrate, sodium aspartate, sodium lactate, sodium caseinate, sodium ascorbate, and a mixture thereof.

[9] The coffee beverage according to any of [1] to [8], wherein the coffee beverage comprises 25 to 40 mg/100 ml of sodium, energy is 50 Kcal/100 ml or less, and X1+X2 is 6 or more.

[10] The coffee beverage according to any of [1] to [9], which is packed in a container.

[11] A method for producing a coffee beverage, comprising: to a raw material,
(i) adding (a) a natural sugar in an amount corresponding to a sweetness intensity X1 and (b) a high-intensity sweetener in an amount corresponding to a sweetness intensity X2; and
(ii) adding (c) sodium such that a sodium content in the beverage is 5 mg/100 ml to 90 mg/100 ml,
wherein the high-intensity sweetener comprises at least one high-intensity sweetener b1 selected from the group consisting of rebaudioside M, rebaudioside D, rebaudioside N, rebaudioside O, rebaudioside E, a Luo han guo extract, mogroside V, and thaumatin; and $0.1<(X1+X2)\leq 20$ is satisfied.

[12] The method according to [11], wherein in the coffee beverage, the sodium content is 25 to 60 mg/100 ml.

[13] The method according to [11] or [12], wherein energy of the coffee beverage is 50 Kcal/100 ml or less.

[14] The method according to any of [11] to [13], wherein X1 is 0.1 to 5.9.

[15] The method according to any of [11] to [14], wherein the coffee beverage comprises 40 mg/100 ml to 100 mg/100 ml of caffeine.

[16] The method according to any of [11] to [15], wherein the natural sugar is at least one selected from the group consisting of glucose, sucrose, fructose, maltose, oligosaccharide, high-fructose corn syrup, lactose, psicose, allose, tagatose, and a combination thereof.

[17] The method according to any of [11] to [16], wherein the high-intensity sweetener is at least one selected from the group consisting of rebaudioside M, rebaudioside D, a Luo han guo extract, mogroside V, and a combination thereof.

[18] The method according to any of [11] to [17], wherein the sodium is at least one selected from the group consisting of sodium chloride, sodium hydroxide, sodium malate, sodium sulfate, sodium citrate, sodium phosphate, sodium carbonate, sodium disulfide, sodium bicarbonate, sodium alginate, sodium arginınate, sodium glucoheptanoate, sodium gluconate, sodium glutamate, sodium tartrate, sodium aspartate, sodium lactate, sodium caseinate, sodium ascorbate, and a mixture thereof.

[19] The method according to any of [11] to [18], wherein in the coffee beverage, the sodium content is 25 to 40 mg/100 ml, energy is 50 Kcal/100 ml or less, and X1+X2 is 6 or more.

[20] A concentrate for providing the coffee beverage according to [1], comprising:
(a) a natural sugar in an amount corresponding to a sweetness intensity X4;
(b) a high-intensity sweetener in an amount corresponding to a sweetness intensity X5; and
(c) 50 mg/100 ml to 900 mg/100 ml of sodium, wherein $(X4+X5)\leq 200$ is satisfied.

[21] A method for enhancing a sweetness of a coffee beverage, comprising: containing
(a) a natural sugar in an amount corresponding to a sweetness intensity X1;
(b) a high-intensity sweetener in an amount corresponding to a sweetness intensity X2; and
(c) 5 mg/100 ml to 90 mg/100 ml of sodium, in the coffee beverage.

Advantageous Effects of Invention

The present invention provides a method for increasing the sweetness of a coffee beverage, which is not a simple sweetness that is obtained by increasing the amounts of a natural sugar and a high-intensity sweetener used, and providing good taste quality. In addition, the method of the present invention provides a coffee beverage having good taste quality with increased sweetness by a means other than control of the used amounts of sugar and sweetener.

DESCRIPTION OF EMBODIMENTS

Hereinafter, the present invention will be described in detail. The following embodiments are examples to describe the present invention and do not intend to limit the present invention only to these embodiments. The present invention can be carried out in various embodiments without departing from the spirit of the present invention.

Note that all of the literatures, laid-open publications, patent publications, and other patent literatures cited herein are deemed to be incorporated by reference into the present specification.

In the present specification, for example, the phrase "the content of the A component is X mg/100 ml" means that "X mg of the A component is contained in 100 ml of the beverage". In addition, for example, the phrase "the content of the B component is Y ppm" means that "the B component is contained in Y ppm with respect to the total amount (100 mass %) of the beverage".

1. Coffee Beverage Having Improved Taste Quality Exhibited by Natural Sugar and High-Intensity Sweetener The present invention provides, as a first aspect, the following coffee beverage (hereinafter, referred to as "the coffee beverage of the present invention").

A coffee beverage comprising:
(a) a natural sugar in an amount corresponding to a sweetness intensity X1;
(b) a high-intensity sweetener in an amount corresponding to a sweetness intensity X2; and
(c) 5 mg/100 ml to 90 mg/100 ml of sodium,
wherein the high-intensity sweetener comprises at least one high-intensity sweetener b1 selected from the group consisting of rebaudioside M, rebaudioside D, rebaudioside N, rebaudioside O, rebaudioside E, a Luo han guo extract, mogroside V, and thaumatin; and $0.1<(X1+X2)\leq 20$ is satisfied.

In the coffee beverage of the present invention, sweetness of a sweetness intensity X3 is exhibited by the above-mentioned components (a) to (c).

That is, in the coffee beverage of the present invention, the components having sweetness are (a) a natural sugar in a specific amount and (b) a specific high-intensity sweetener in a specific amount. The calculated sweetness of the coffee beverage of the present invention is supposed to be the total value of the sweetness intensity when the component (a) is added to the coffee beverage and the sweetness intensity when the component (b) is added to the coffee beverage. However, although the concentration is low, since (c) sodium is present in the coffee beverage, the sweetness exhibited by (a) a natural sugar and (b) a high-intensity sweetener is enhanced, and the coffee beverage of the present invention achieves sweetness exceeding the mere sum of the individual sweetness intensities. The present invention means to possibly include additional components such as a milk component, an acidulant, a flavoring agent, and an extract, in addition to these components (a) to (c). However, the coffee beverage of the present invention does not contain a sweet component other than the components (a) and (b) as a sweetener.

Further, the coffee beverage according to a preferable aspect of the present invention achieves an effect of improving the taste quality, in addition to an increase in sweetness. For example, in a coffee beverage according to an aspect of the present invention, it is preferable to improve at least one of the intensity of flavor and suppression of odd taste (such as bitter taste and astringent taste). Incidentally, the effect of extracting flavor can be confirmed by not only sensory evaluation but also analysis of the amount of volatilized aroma components by gas chromatography.

(Coffee Beverage)

In the present invention, the term "coffee beverage" refers to a beverage product produced using a coffee component as a raw material. The type of the product is not particularly limited, and examples thereof mainly include "coffee", "coffee beverage", and "coffee-containing soft drink" defined in the "fair competition rules for labeling of coffee beverages and the like" established in 1977. In addition, in also beverages containing a coffee component as a raw material, although a beverage containing a milk solid in an amount of 3.0 mass % or more is a subject to which the "fair competition rules for milk beverage labeling" is applied and is treated as a "milk beverage", such a beverage is encompassed in the scope of the coffee beverage of the present invention.

Here, the coffee component (in the present specification, also referred to as extract of roasted coffee beans) is a solution containing a component derived from a coffee bean, and examples thereof include a coffee extract liquid, i.e., a solution extracted from roasted and ground coffee beans using water, warm water, or the like. In addition, a solution prepared by adjusting, for example, a coffee extract obtained by concentrating a coffee extract liquid or instant coffee obtained by drying a coffee extract liquid to an appropriate amount with water, warm water, or the like is also an example of the coffee component.

The species of the coffee beans that are used in the coffee beverage of the present invention is not particularly limited. Examples of the cultivated tree species include *Coffea arabica, Coffea robusta*, and *Coffea liberica*, and examples of the coffee bean variety include Mocha, Brazil, Colombia, Guatemala, Blue Mountain, Kona, Mandolin, and Kilimanjaro. As the coffee beans, one species may be used, or a plurality of species may be used in combination. The roasting method of roasted coffee beans is not particularly limited, the roasting temperature and the roasting environment are also not limited at all, and a usual method can be adopted, but the degree of roasting, L value, of coffee beans is preferably 18 to 24. Furthermore, the extraction method from the roasted coffee beans is also not limited at all, and, for example, a method of extracting from a ground product prepared by coarsely, medium, or finely grinding roasted coffee beans with water or warm water (0° C. to 100° C.) for 10 seconds to 30 minutes is mentioned. The extraction method may be, for example, a drip type, a siphon type, a boiling type, a jet type, or a continuous type.

The coffee beverage of the present invention may contain a milk component, such as milk, cow's milk, or a dairy product. In addition, the coffee beverage of the present invention may be decaffeinated or contain caffeine, and the concentration of caffeine contained is not particularly limited, but is preferably about 40 mg/100 ml to 100 mg/100 ml. In addition, the concentration of chlorogenic acid in the coffee beverage of the present invention is not particularly limited, but is preferably about 15 to 85 mg/100 ml.

The form of the coffee beverage of the present invention is not limited, and the coffee beverage may be, for example, in a form of a concentrated coffee extract or a beverage in which instant coffee is dissolved or in a form of a packaged coffee beverage packed and sealed in a container, such as a can or a PET bottle.

(Natural Sugar)

In the present invention, a "natural sugar", which is represented by the general formula of $C_m(H_2O)_n$, wherein m and n independently represent a natural number, contains a D-form carbohydrate, digestible by humans. Examples of the D-form carbohydrate include glucose, sucrose, fructose, maltose, oligosaccharides (for example, fructooligosaccharide, maltooligosaccharide, isomaltooligosaccharide, and galactooligosaccharide), high-fructose corn syrup (isomerized sugars), lactose, psicose, allose, tagatose, and combinations thereof. Further, a sugar derived from a milk component is included in a natural sugar.

Examples of the combination of glucose, sucrose, fructose, maltose, oligosaccharides, high-fructose corn syrup, and lactose include the following. Specifically, the combination includes sucrose and high-fructose corn syrup, sucrose and glucose, sucrose and fructose, sucrose and maltose, sucrose and an oligosaccharide, sucrose and lactose, high-fructose corn syrup and an oligosaccharide, sucrose and psicose; sucrose, high-fructose corn syrup, and glucose; sucrose, high-fructose corn syrup, and fructose; sucrose, high-fructose corn syrup, and maltose; sucrose, high-fructose corn syrup, and an oligosaccharide; sucrose, high-fructose corn syrup, glucose, and an oligosaccharide; sucrose, glucose, fructose, and an oligosaccharides; and glucose, sucrose, fructose, maltose, an oligosaccharide, high-fructose corn syrup, lactose, and tagatose.

Since a natural sugar has high energy, the energy (calorie) of the coffee beverage can be greatly reduced by decreasing the content of the natural sugar. The present invention keeps the concentration of the natural sugar low to decrease the energy (i.e., low calorie), but strong sweetness is felt when ingested by a combination of a natural sugar, a high-intensity sweetener, and sodium. Accordingly, the amount of the natural sugar of a sweetness intensity X1 is preferably an amount of providing an energy of 50 Kcal/100 ml or less. The energy of the coffee beverage of the present invention may be 0 to 50 Kcal/100 ml, 0 to 45 Kcal/100 ml, 0 to 40 Kcal/100 ml, 0 to 35 Kcal/100 ml, 0 to 30 Kcal/100 ml, 0 to 25 Kcal/100 ml, 0 to 22 Kcal/100 ml, 0 to 20 Kcal/100 ml, 0 to 15 Kcal/100 ml, 0 to 10 Kcal/100 ml, 0 to 5 Kcal/100 ml, 5 to 50 Kcal/100 ml, 5 to 45 Kcal/100 ml, 5 to 40 Kcal/100 ml, 5 to 35 Kcal/100 ml, 5 to 30 Kcal/100 ml, 5 to 25 Kcal/100 ml, 5 to 20 Kcal/100 ml, 5 to 15 Kcal/100 ml, 5 to 10 Kcal/100 ml, 10 to 50 Kcal/100 ml, 10 to 45 Kcal/100 ml, 10 to 40 Kcal/100 ml, 10 to 35 Kcal/100 ml, 10 to 30 Kcal/100 ml, 10 to 25 Kcal/100 ml, 10 to 20 Kcal/100 ml, 10 to 15 Kcal/100 ml, 15 to 50 Kcal/100 ml, 15 to 45 Kcal/100 ml, 15 to 40 Kcal/100 ml, 15 to 35 Kcal/100 ml, 15 to 30 Kcal/100 ml, 15 to 25 Kcal/100 ml, 15 to 20 Kcal/100 ml, 20 to 50 Kcal/100 ml, 20 to 45 Kcal/100 ml, 20 to 40 Kcal/100 ml, 20 to 35 Kcal/100 ml, 20 to 30 Kcal/100 ml, 20 to 25 Kcal/100 ml, 25 to 50 Kcal/100 ml, 25 to 45 Kcal/100 ml, 25 to 40 Kcal/100 ml, 25 to 35 Kcal/100 ml, or 25 to 30 Kcal/100 ml, depending on embodiments. The energy of the coffee beverage of the present invention may also be 0 to 32 Kcal/100 ml, 0 to 24 Kcal/100 ml, 0 to 8 Kcal/100 ml, 0 to 4 Kcal/100 ml, 4 to 32 Kcal/100 ml, 4 to 24 Kcal/100 ml, 4 to 8 Kcal/100 ml, 8 to 32 Kcal/100 ml, 8 to 24 Kcal/100 ml, or 24 to 32 Kcal/100 ml, depending on embodiments. When a high calorie component such as a milk component, a total calorie of a natural sugar and a component such as a milk component is preferably 50 Kcal/100 ml or less.

Additionally, X1 of "the sweetness intensity X1" may be 0 to 0.5, 0 to 1.0, 0 to 1.5, 0 to 2.0, 0 to 2.5, 0 to 3.0, 0 to 3.5, 0 to 4.0, 0 to 4.5, 0 to 5.0, 0 to 5.5, 0 to 6.0, 0 to 6.5, 0 to 7.0, 0 to 7.5, 0 to 8.0, 0 to 8.25, 0 to 8.5, 0 to 8.75, 0 to 9.0, 0 to 9.25, 0 to 9.5, 0 to 9.75, 0 to 10.0, 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.05 to 6.0, 0.05 to 6.5, 0.05 to 7.0, 0.05 to 7.5, 0.05 to 8.0, 0.05 to 8.25, 0.05 to 8.5, 0.05 to 8.75, 0.05 to 9.0, 0.05 to 9.25, 0.05 to 9.5, 0.05 to 9.75, 0.05 to 10.0, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.1 to 5.9, 0.1 to 6.0, 0.1 to 6.5, 0.1 to 7.0, 0.1 to 7.5, 0.1 to 8.0, 0.1 to 8.25, 0.1 to 8.5, 0.1 to 8.75, 0.1 to 9.0, 0.1 to 9.25, 0.1 to 9.5, 0.1 to 9.75, 0.1 to 10.0, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 0.5 to 6.0, 0.5 to 6.5, 0.5 to 7.0, 0.5 to 7.5, 0.5 to 8.0, 0.5 to 8.25, 0.5 to 8.5, 0.5 to 8.75, 0.5 to 9.0, 0.5 to 9.25, 0.5 to 9.5, 0.5 to 9.75, 0.5 to 10.0, 1.0 to 0.5, 1.0 to 1.0, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.0 to 6.0, 1.0 to 6.5, 1.0 to 7.0, 1.0 to 7.5, 1.0 to 8.0, 1.0 to 8.25, 1.0 to 8.5, 1.0 to 8.75, 1.0 to 9.0, 1.0 to 9.25, 1.0 to 9.5, 1.0 to 9.75, 1.0 to 10.0, 1.5 to 0.5, 1.5 to 1.0, 1.5 to 1.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 1.5 to 6.0, 1.5 to 6.5, 1.5 to 7.0, 1.5 to 7.5, 1.5 to 8.0, 1.5 to 8.25, 1.5 to 8.5, 1.5 to 8.75, 1.5 to 9.0, 1.5 to 9.25, 1.5 to 9.5, 1.5 to 9.75, 1.5 to 10.0, 2.0 to 0.5, 2.0 to 1.0, 2.0 to 1.5, 2.0 to 2.0, 2.0 to 2.5, 2.0 to 3.0, 2.0 to 3.5, 2.0 to 4.0, 2.0 to 4.5, 2.0 to 5.0, 2.0 to 5.5, 2.0 to 6.0, 2.0 to 6.5, 2.0 to 7.0, 2.0 to 7.5, 2.0 to 8.0, 2.0 to 8.25, 2.0 to 8.5, 2.0 to 8.75, 2.0 to 9.0, 2.0 to 9.25, 2.0 to 9.5, 2.0 to 9.75, 2.0 to 10.0, 2.5 to 0.5, 2.5 to 1.0, 2.5 to 1.5, 2.5 to 2.0, 2.5 to 2.5, 2.5 to 3.0, 2.5 to 3.5, 2.5 to 4.0, 2.5 to 4.5, 2.5 to 5.0, 2.5 to 5.5, 2.5 to 6.0, 2.5 to 6.5, 2.5 to 7.0, 2.5 to 7.5, 2.5 to 8.0, 2.5 to 8.25, 2.5 to 8.5, 2.5 to 8.75, 2.5 to 9.0, 2.5 to 9.25, 2.5 to 9.5, 2.5 to 9.75, or 2.5 to 10.0.

X1 may also be 0 to 10.5, 0 to 11.0, 0 to 11.5, 0 to 12.0, 0 to 12.5, 0 to 13.0, 0 to 13.5, 0 to 14.0, 0 to 14.5, 0 to 15.0, 0.05 to 10.5, 0.05 to 11.0, 0.05 to 11.5, 0.05 to 12.0, 0.05 to 12.5, 0.05 to 13.0, 0.05 to 13.5, 0.05 to 14.0, 0.05 to 14.5, 0.05 to 15.0, 0.1 to 10.5, 0.1 to 11.0, 0.1 to 11.5, 0.1 to 12.0, 0.1 to 12.5, 0.1 to 13.0, 0.1 to 13.5, 0.1 to 14.0, 0.1 to 14.5, 0.1 to 15.0, 0.5 to 10.5, 0.5 to 11.0, 0.5 to 11.5, 0.5 to 12.0, 0.5 to 12.5, 0.5 to 13.0, 0.5 to 13.5, 0.5 to 14.0, 0.5 to 14.5, 0.5 to 15.0, 1.0 to 10.5, 1.0 to 11.0, 1.0 to 11.5, 1.0 to 12.0, 1.0 to 12.5, 1.0 to 13.0, 1.0 to 13.5, 1.0 to 14.0, 1.0 to 14.5, 1.0 to 15.0, 1.5 to 10.5, 1.5 to 11.0, 1.5 to 11.5, 1.5 to 12.0, 1.5 to 12.5, 1.5 to 13.0, 1.5 to 13.5, 1.5 to 14.0, 1.5 to 14.5, 1.5 to 15.0, 2.0 to 10.5, 2.0 to 11.0, 2.0 to 11.5, 2.0 to 12.0, 2.0 to 12.5, 2.0 to 13.0, 2.0 to 13.5, 2.0 to 14.0, 2.0 to 14.5, 2.0 to 15.0, 2.5 to 10.5, 2.5 to 11.0, 2.5 to 11.5, 2.5 to 12.0, 2.5 to 12.5, 2.5 to 13.0, 2.5 to 13.5, 2.5 to 14.0, 2.5 to 14.5, or 2.5 to 15.0.

The amount corresponding to the sweetness intensity X1 of the natural sugar refers to an amount (a concentration) that exhibits the sweetness of the sweetness intensity X1 under conditions where the natural sugar is dissolved in water at 20° C. having a volume equivalent to that of the coffee beverage of the present invention.

Here, the sweetness intensity means sweetness exhibited by a substance. For example, in the case where the sweetness intensity exhibited by sucrose per unit concentration Brix 1 is defined as a degree of sweetness of 1, glucose has a degree of sweetness of 0.6 to 0.7 (center value: 0.65). A numerical value obtained by multiplying this degree of sweetness by the concentration Brix value of glucose is the sweetness intensity of glucose. Thus, when the concentration of glucose is Brix 1.5, the sweetness intensity of glucose is 0.65×1.5=0.975. When calculating the sweetness intensity in the present invention, the sweetness intensity of a sugar showing a range in the degree of sweetness, the center value is used unless otherwise noted.

TABLE 1

| Sugar (D-form) | Degree of sweetness |
|---|---|
| Sucrose | 1 |
| Glucose | 0.6 to 0.7 |
| Fructose | 1.3 to 1.7 |
| Maltose | 0.4 |
| Fructooligosaccharide | 0.6 |
| Maltooligosaccharide | 0.3 |
| Isomaltooligosaccharide | 0.4 to 0.5 |
| Galactooligosaccharide | 0.7 |
| Isomerized sugar | 0.8 to 0.9 |
| Lactose | 0.2 to 0.3 |
| Psicose | 0.7 |
| Allose | 0.8 |
| Tagatose | 0.9 |

(High-Intensity Sweetener)

In the present invention, the "high-intensity sweetener" refers to a compound having sweetness more intense than that of sucrose, and may be a naturally occurring compound, a synthetic compound, and a combination of a naturally occurring compound and a synthetic compound. The high-intensity sweetener, in an amount equivalent to sucrose, exhibits sweetness 5 times or more, 10 times or more, 50 times or more, 100 times or more, 500 times or more, 1000 times or more, 5000 times or more, 10000 times or more, 50000 times or more, or 100000 times or more as that of sucrose. The high-intensity sweetener exhibits extremely intense sweetness in this way. When the existence of the natural sugar and high-intensity sweetener in the food or beverage of the present invention is expressed in a weight ratio, "natural sugar:high-intensity sweetener" is 5:1 to 10:1, 50:1 to 100:1, 50:1 to 200:1, 500:1 to 1000:1, 5000:1 to 10000:1, and 50000:1 to 100000:1.

In the present invention, as the high-intensity sweetener, at least one high-intensity sweetener b1 selected from the group consisting of rebaudioside M, rebaudioside D, rebaudioside N, rebaudioside O, rebaudioside E, a Luo han guo extract, mogroside V, and thaumatin is used.

The content of the high-intensity sweetener b1 based on the total amount (100 mass %) of the high-intensity sweetener as the component (b) is preferably 50 mass % or more, more preferably 60 mass % or more, further preferably 70 mass % or more, more further preferably 80 mass % or more, and particularly preferably 90 mass % or more. In an aspect of the present invention, the high-intensity sweetener as the component (b) may substantially consist of the high-intensity sweetener b1. In the present specification, the phrase "substantially consist of the high-intensity sweetener b1" means that impurities, such as other steviol glycoside and mogroside, which are inevitably included in the process (e.g., purification of a *Stevia* extract or a Luo han guo extract or biosynthesis) of preparing the high-intensity sweetener b1 may be included.

Rebaudioside M, rebaudioside D, rebaudioside N, rebaudioside O, and rebaudioside E may be directly extracted from *Stevia* or may be obtained by attaching glucose to a compound having another structure contained in a *Stevia* extract.

The Luo han guo extract as a sweetener is an extract of Luo han guo containing a sweet substance derived from Luo han guo, and has been approved as a food additive in various countries including Japan and is commercially available. Examples of the sweet substance derived from Luo han guo include mogroside V, mogroside IV, 11-oxo-mogroside V, and Siamenoside I.

Mogroside V is one of the major mogrol glycosides contained in Luo han guo, and it has been reported that it has a good-quality sweetness property close to sucrose when compared with rebaudioside A. In addition, the degree of sweetness of mogroside V is about 300 times that of sucrose (Murata Y. et al., Nippon Shokuhin Kagaku Kogaku Kaishi, Vol. 53, No. 10, 527 to 533, (2006)). Mogroside V can be obtained from a Luo han guo extract (e.g., an alcohol extract of Luo han guo) through purification by chromatography or the like. Alternatively, mogroside V may be obtained by attaching glucose to a compound having another structure contained in a Luo han guo extract.

The Luo han guo extract preferably contains mogroside V and the ratio thereof is not limited and can be 10 wt % or more, 15 wt % or more, 20 wt % or more, 25 wt % or more, 30 wt % or more, 35 wt % or more, 40 wt % or more, 45 wt % or more, 50 wt % or more, 55 wt % or more, 60 wt % or more, 65 wt % or more, 70 wt % or more, and 75 wt % or more, of the total dry weight of a Luo han guo extract. The content of mogroside V can be determined by a known technique such as liquid chromatography. The Luo han guo extract can be obtained by extracting a fruit of Luo han guo (*Siraitia grosvenorii*) with a suitable solvent (for example, an aqueous solvent such as water, an alcohol solvent such as ethanol or methanol, a mixed solvent of an aqueous solvent and an alcohol solvent such as water-containing ethanol or water-containing methanol), and then optionally carrying out a treatment such as degreasing, purification, concentration, and drying.

Mogroside V may be one having a high purity, for example, a purity of 80% or more, 85% or more, 90% or more, 91% or more, 92% or more, 93% or more, 94% or more, 95% or more, 96% or more, 97% or more, or 98% or more. In mogroside V obtained by purifying a Luo han guo extract, understandably, the amount of Luo han guo extract components other than mogroside V is decreased with an increase in purity.

Thaumatin is a protein-based sweetener extracted from a plant.

In the present invention, an optional high-intensity sweetener b2 may be used in combination with the above-described high-intensity sweetener b1, as needed. Specific examples of the optional high-intensity sweetener b2 include peptide-based sweeteners, such as aspartame, neotame, and alitame; sucrose derivatives, such as sucralose; synthetic sweeteners, such as acesulfame K, saccharine, advantame, cyclamate, and dulcin; protein-based sweeteners extracted from plants, such as monellin, curculin, and brazzein, other than thaumatin; high-intensity sweeteners other than protein-based sweetener extracted from plants; tourmaline; and neohesperidin dihydrochalcone.

The sucrose derivative is that obtained by substituting the OH group or the H group of sucrose with another substituent, and examples thereof include halogen derivatives of sucrose (sucralose), oxathiazinonedioxide derivatives, sugar alcohols, aldonic acid, and uronic acid.

Examples of the high-intensity sweetener other than the protein-based sweeteners extracted from plants include sweeteners present in a *Stevia* extract, other than rebaudioside M, rebaudioside D, rebaudioside N, rebaudioside O, and rebaudioside E; sweeteners present in a Luo han guo extract, other than mogroside V; sweeteners present in a *Glycyrrhiza* extract; and glycosides thereof, and also include monatin and glycyrrhizin.

Examples of the sweetener present in a *Stevia* extract, other than rebaudioside M, rebaudioside D, rebaudioside N, rebaudioside O, and rebaudioside E and the glycoside thereof include steviol, stevioside, rebaudioside A, rebaudioside B, and rebaudioside C.

Examples of the sweetener present in a Luo han guo extract, other than mogroside V and the glycoside thereof include mogroside IV.

The *Glycyrrhiza* extract refers to that obtained from roots or rhizomes of *Glycyrrhiza uralensis* Fisher, *Glycyrrhiza inflata* Batalin, or *Glycyrrhiza glabra* Linne and having glycyrrhizic acid as a main component. Examples of the *Glycyrrhiza* extract include a *Glycyrrhiza* extract, glycyrrhizin, and a licorice extract.

In the present invention, the high-intensity sweetener b1 is suitable at least one selected from the group consisting of rebaudioside M, rebaudioside D, a Luo han guo extract, mogroside V, and a combination thereof. In particular, rebaudioside D, rebaudioside M, or a mixture of rebaudioside D and rebaudioside M is suitable as the high-intensity sweetener b1.

Rebaudioside D and rebaudioside M have less negative flavor, such as astringent taste and metallic taste, which is observed in rebaudioside A and have characteristics, such as good-quality sweetness, and they are expected to be used in the fields of food and drink (NIPPON KAGAKU KAISHI, (5), (1981), 726-735, "Sweet Diterpene-Glycoside of Leaves of *Stevia rebaudiana* Bertoni Synthesis and Structure-Sweetness Relationship of Rebaudiosides-A, -D, -E and Their Related glycosides", Kasai, Kaneda, Tanaka, Yamasaki, Sakamoto, Morimoto, Okada, Kitahata, and Furukawa). Thus, rebaudioside D and rebaudioside M when used alone are excellent in that they have less odd taste compared to rebaudioside A and sweetness close to sucrose. Rebaudioside D and rebaudioside M each have sweetness about 200 times that of sucrose.

Examples of the combination of the high-intensity sweeteners b1 and the combination of the high-intensity sweetener b1 and the optional high-intensity sweetener b2 include the followings. Specifically, the examples include combinations of rebaudioside D and rebaudioside M; rebaudioside D and rebaudioside A; rebaudioside M and rebaudioside A; rebaudioside M and mogroside V; rebaudioside D and mogroside V; rebaudioside D and advantame; rebaudioside D and acesulfame K; rebaudioside D and sucralose; rebaudioside M, rebaudioside D, and rebaudioside A; rebaudioside M, rebaudioside D, and mogroside V; rebaudioside M, rebaudioside D, and advantame; rebaudioside M, rebaudioside D, and acesulfame K; rebaudioside M, rebaudioside D, and sucralose; rebaudioside A, rebaudioside M, rebaudioside D, and mogroside V; rebaudioside A, rebaudioside M, mogroside V, and sucralose; rebaudioside D, rebaudioside M, mogroside V, and acesulfame K; rebaudioside M, rebaudioside A, mogroside V, and neohesperidin dihydrochalcone; and rebaudioside M, rebaudioside D, sucralose, neohesperidin dihydrochalcone, and brazzein.

In addition, the examples include combinations of rebaudioside D and mogroside V; rebaudioside D and a Luo han guo extract; rebaudioside M and a Luo han guo extract; rebaudioside M, rebaudioside D, and a Luo han guo extract; rebaudioside A, rebaudioside M, rebaudioside D, and a Luo han guo extract; rebaudioside A, rebaudioside M, a Luo han guo extract, and sucralose; rebaudioside D, rebaudioside M, a Luo han guo extract, and acesulfame K; and rebaudioside M, rebaudioside A, a Luo han guo extract, and neohesperidin dihydrochalcone.

X2 of "the sweetness intensity X2" may be 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, 3.0 to 5.5, 2.0 to 6.5, 2.0 to 7.0, 2.0 to 7.5, 2.0 to 6.0, 2.5 to 7.0, 2.5 to 7.5, 2.5 to 6.0, 2.5 to 6.5, 3.0 to 6.0, 3.0 to 6.5, 3.0 to 7.0, 3.0 to 7.5, 3.0 to 8.0, 3.0 to 8.5, 3.0 to 9.0, 3.0 to 9.5, 3.5 to 7.0, 3.5 to 7.5, 3.5 to 8.0, 4.5 to 8.5, 3.5 to 9.0, 3.5 to 9.5, 4.0 to 7.5, 4.0 to 8.0, 4.0 to 8.5, 4.0 to 9.0, 4.0 to 9.5, 3.5 to 8.5, 3.5 to 10.0, 3.5 to 10.5, 3.5 to 11.0, 3.5 to 11.5, or 4.0 to 11.5.

X2 may also be 0.05 to 6.0, 0.05 to 6.5, 0.05 to 7.0, 0.05 to 7.5, 0.05 to 8.0, 0.05 to 8.5, 0.05 to 9.0, 0.05 to 9.5, 0.05 to 10.0, 0.05 to 10.5, 0.05 to 11.0, 0.05 to 11.5, 0.05 to 12.0, 0.05 to 13.0, 0.05 to 14.0, 0.05 to 15.0, 0.05 to 16.0, 0.05 to 17.0, 0.05 to 18.0, 0.5 to 6.0, 0.5 to 6.5, 0.5 to 7.0, 0.5 to 7.5, 0.5 to 8.0, 0.5 to 8.5, 0.5 to 9.0, 0.5 to 9.5, 0.5 to 10.0, 0.5 to 10.5, 0.5 to 11.0, 0.5 to 11.5, 0.5 to 12.0, 0.5 to 13.0, 0.5 to 14.0, 0.5 to 15.0, 0.5 to 16.0, 0.5 to 17.0, 0.5 to 18.0, 1.0 to 6.0, 1.0 to 6.5, 1.0 to 7.0, 1.0 to 7.5, 1.0 to 8.0, 1.0 to 8.5, 1.0 to 9.0, 1.0 to 9.5, 1.0 to 10.0, 1.0 to 10.5, 1.0 to 11.0, 1.0 to 11.5, 1.0 to 12.0, 1.0 to 13.0, 1.0 to 14.0, 1.0 to 15.0, 1.0 to 16.0, 1.0 to 17.0, 1.0 to 18.0, 1.5 to 6.0, 1.5 to 6.5, 1.5 to 7.0, 1.5 to 7.5, 1.5 to 8.0, 1.5 to 8.5, 1.5 to 9.0, 1.5 to 9.5, 1.5 to 10.0, 1.5 to 10.5, 1.5 to 11.0, 1.5 to 11.5, 1.5 to 12.0, 1.5 to 13.0, 1.5 to 14.0, 1.5 to 15.0, 1.5 to 16.0, 1.5 to 17.0, 1.5 to 18.0, 2.0 to 8.0, 2.0 to 8.5, 2.0 to 9.0, 2.0 to 9.5, 2.0 to 10.0, 2.0 to 10.5, 2.0 to 11.0, 2.0 to 11.5, 2.0 to 12.0, 2.0 to 13.0, 2.0 to 14.0, 2.0 to 15.0, 2.0 to 16.0, 2.0 to 17.0, 2.0 to 18.0, 2.5 to 8.0, 2.5 to 8.5, 2.5 to 9.0, 2.5 to 9.5, 2.5 to 10.0, 2.5 to 10.5, 2.5 to 11.0, 2.5 to 11.5, 2.5 to 12.0, 2.5 to 13.0, 2.5 to 14.0, 2.5 to 15.0, 2.5 to 16.0, 2.5 to 17.0, 2.5 to 18.0, 3.0 to 10.0, 3.0 to 10.5, 3.0 to 11.0, 3.0 to 11.5, 3.0 to 12.0, 3.0 to 13.0, 3.0 to 14.0, 3.0 to 15.0, 3.0 to 16.0, 3.0 to 17.0, 3.0 to 18.0, 3.5 to 4.0, 3.5 to 4.5, 3.5 to 5.0, 3.5 to 5.5, 3.5 to 6.0, 3.5 to 6.5, 3.5 to 12.0, 3.5 to 13.0, 3.5 to 14.0, 3.5 to 15.0, 3.5 to 16.0, 3.5 to 17.0, 3.5 to 18.0, 4.0 to 4.5, 4.0 to 5.0, 4.0 to 5.5, 4.0 to 6.0, 4.0 to 6.5, 4.0 to 7.0, 4.0 to 10.0, 4.0 to 10.5, 4.0 to 11.0, 4.0 to 12.0, 4.0 to 13.0, 4.0 to 14.0, 4.0 to 15.0, 4.0 to 16.0, 4.0 to 17.0, or 4.0 to 18.0.

The amount corresponding to a sweetness intensity X2 of a high-intensity sweetener refers to an amount which provides sweetness of a sweetness intensity X2 under the conditions when the high-intensity sweetener is dissolved in water having the same volume as the coffee beverage of the present invention at 20° C.

As in a natural sugar, also here, the sweetness intensity means the sweetness exhibited by a substance. For example, when the sweetness intensity exhibited by sucrose per unit concentration Brix 1 is defined as a degree of sweetness of 1, the degree of sweetness of rebaudioside D is 200 to 250 (center value 225), the degree of sweetness of rebaudioside M is 200 to 260 (center value 230), the degree of sweetness of rebaudioside N is 200 to 250 (center value 225), the degree of sweetness of rebaudioside O is 200 to 250 (center value 225), the degree of sweetness of rebaudioside E is 70 to 80 (center value 75), the degree of sweetness of a Luo han guo extract is 110 to 150 (center value 130), the degree of sweetness of mogroside V is 240 to 300 (center value 270), and the degree of sweetness of thaumatin is 2,000. The numerical value obtained by multiplying these degrees of sweetness by the concentration (w/v % (considered to be the same as w/w % in the case of a beverage)) of the high-intensity sweetener in the coffee beverage is the sweetness intensity of the high-intensity sweetener. When calculating the sweetness intensity in the present invention, the sweetness intensity of a high-intensity sweetener showing a range in the degree of sweetness, the center value is used unless otherwise noted.

Further, the amount of a high-intensity sweetener can be P2 ppm and P2 ppm herein refers to an amount corresponding to a sweetness intensity X2. The P2 herein can be a value of 20 to 550, 25 to 550, 30 to 550, 35 to 550, 40 to 550, 45 to 550, 50 to 550, 55 to 550, 20 to 540, 25 to 540, 30 to 540, 35 to 540, 40 to 540, 45 to 540, 50 to 540, 55 to 540, 20 to 530, 25 to 530, 30 to 530, 35 to 530, 40 to 530, 45 to 530, 50 to 530, 55 to 530, 20 to 520, 25 to 520, 30 to 520, 35 to 520, 40 to 520, 45 to 520, 50 to 520, 55 to 520, 20 to 510, 25 to 510, 30 to 510, 35 to 510, 40 to 510, 45 to 510, 50 to 510, 55 to 510, 20 to 505, 25 to 505, 30 to 505, 35 to 505, 40 to 505, 45 to 505, 50 to 505, 55 to 505, 20 to 500, 25 to 500, 30 to 500, 35 to 500, 40 to 500, 45 to 500, 50 to 500, 55 to 500, 20 to 495, 25 to 495, 30 to 495, 35 to 495, 40 to 495, 45 to 495, 50 to 495, 55 to 495, 20 to 490, 25 to 490, 30 to 490, 35 to 490, 40 to 490, 45 to 490, 50 to 490, or 55 to 490.

The P2 can also be a value of 1 to 1500, 1 to 1200, 5 to 1200, 1 to 1000, 5 to 1000, 10 to 1000, 1 to 900, 5 to 900, 10 to 900, 15 to 900, 20 to 900, 25 to 900, 30 to 900, 35 to 900, 40 to 900, 45 to 900, 50 to 900, 55 to 900, 1 to 800, 5 to 800, 10 to 800, 15 to 800, 20 to 800, 25 to 800, 30 to 800, 35 to 800, 40 to 800, 45 to 800, 50 to 800, 55 to 800, 1 to 700, 5 to 700, 10 to 700, 15 to 700, 20 to 700, 25 to 700, 30 to 700, 35 to 700, 40 to 700, 45 to 700, 50 to 700, 55 to 700, 1 to 600, 5 to 600, 10 to 600, 15 to 600, 20 to 600, 25 to 600, 30 to 600, 35 to 600, 40 to 600, 45 to 600, 50 to 600, 55 to 600, 1 to 550, 1 to 540, 1 to 530, 1 to 520, 1 to 510, 1 to 505, 1 to 500, 1 to 495, 1 to 490, 5 to 550, 5 to 540, 5 to 530, 5 to 520, 5 to 510, 5 to 505, 5 to 500, 5 to 495, 5 to 490, 10 to 550, 10 to 540, 10 to 530, 10 to 520, 10 to 510, 10 to 505, 10 to 500, 10 to 495, 10 to 490, 15 to 550, 15 to 550, 15 to 530, 15 to 520, 15 to 510, 15 to 505, 15 to 500, 15 to 495, or 15 to 490.

(Sodium)

The present invention contains (c) 5 mg/100 ml to 90 mg/100 ml of sodium, which means that the amount of sodium atoms is 5 mg/100 ml to 90 mg/100 ml of sodium. The amount of sodium may be the amount of 5 to 90 mg/100 ml, 5 to 85 mg/100 ml, 5 to 80 mg/100 ml, 5 to 75 mg/100 ml, 5 to 70 mg/100 ml, 5 to 65 mg/100 ml, 5 to 60 mg/100 ml, 5 to 55 mg/100 ml, 5 to 50 mg/100 ml, 5 to 45 mg/100 ml, 5 to 40 mg/100 ml, 5 to 35 mg/100 ml, 5 to 30 mg/100 ml, 5 to 25 mg/100 ml, 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 90 mg/100 ml, 10 to 85 mg/100 ml, 10 to 80 mg/100 ml, 10 to 75 mg/100 ml, 10 to 70 mg/100 ml, 10 to 65 mg/100 ml, 10 to 60 mg/100 ml, 10 to 55 mg/100 ml, 10 to 50 mg/100 ml, 10 to 45 mg/100 ml, 10 to 40 mg/100 ml, 10 to 35 mg/100 ml, 10 to 30 mg/100 ml, 10 to 25 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 90 mg/100 ml, 15 to 85 mg/100 ml, 15 to 80 mg/100 ml, 15 to 75 mg/100 ml, 15 to 70 mg/100 ml, 15 to 65 mg/100 ml, 15 to 60 mg/100 ml, 15 to 55 mg/100 ml, 15 to 50 mg/100 ml, 15 to 45 mg/100 ml, 15 to 40 mg/100 ml, 15 to 35 mg/100 ml, 15 to 30 mg/100 ml, 15 to 25 mg/100 ml, 15 to 20 mg/100 ml, 20 to 90 mg/100 ml, 20 to 85 mg/100 ml, 20 to 80 mg/100 ml, 20 to 75 mg/100 ml, 20 to 70 mg/100 ml, 20 to 65 mg/100 ml, 20 to 60 mg/100 ml, 20 to 55 mg/100 ml, 20 to 50 mg/100 ml, 20 to 45 mg/100 ml, 20 to 40 mg/100 ml, 20 to 35 mg/100 ml, 20 to 30 mg/100 ml, 20 to 25 mg/100 ml, 25 to 90 mg/100 ml, 25 to 85 mg/100 ml, 25 to 80 mg/100 ml, 25 to 75 mg/100 ml, 25 to 70 mg/100 ml, 25 to 65 mg/100 ml, 25 to 60 mg/100 ml, 25 to 55 mg/100 ml, 25 to 50 mg/100 ml, 25 to 45 mg/100 ml, 25 to 40 mg/100 ml, 25 to 35 mg/100 ml, 25 to 30 mg/100 ml, 30 to 90 mg/100 ml, 30 to 85 mg/100 ml, 30 to 80 mg/100 ml, 30 to 75 mg/100 ml, 30 to 70 mg/100 ml, 30 to 65 mg/100 ml, 30 to 60 mg/100 ml, 30 to 55 mg/100 ml, 30 to 50 mg/100 ml, 30 to 45 mg/100 ml, 30 to 40 mg/100 ml, 30 to 35 mg/100 ml, 35 to 90 mg/100 ml, 35 to 85 mg/100 ml, 35 to 80 mg/100 ml, 35 to 75 mg/100 ml, 35 to 70 mg/100 ml, 35 to 65 mg/100 ml, 35 to 60 mg/100 ml, 35 to 55 mg/100 ml, 35 to 50 mg/100 ml, 35 to 45 mg/100 ml, 35 to 40 mg/100 ml, 40 to 90 mg/100 ml, 40 to 85 mg/100 ml, 40 to 80 mg/100 ml, 40 to 75 mg/100 ml, 40 to 70 mg/100 ml, 40 to 65 mg/100 ml, 40 to 60 mg/100 ml, 40 to 55 mg/100 ml, 40 to 50 mg/100 ml, or 40 to 45 mg/100 ml, depending on embodiments.

The amount of sodium may be the amount of 5 to 34 mg/100 ml, 5 to 33 mg/100 ml, 5 to 32 mg/100 ml, 5 to 31 mg/100 ml, 5 to 29 mg/100 ml, 5 to 22 mg/100 ml, 5 to 21 mg/100 ml, 10 to 34 mg/100 ml, 10 to 33 mg/100 ml, 10 to 32 mg/100 ml, 10 to 31 mg/100 ml, 10 to 29 mg/100 ml, 10 to 22 mg/100 ml, 10 to 21 mg/100 ml, 11.5 to 34 mg/100 ml, 11.5 to 33 mg/100 ml, 11.5 to 32 mg/100 ml, 11.5 to 31 mg/100 ml, 11.5 to 30 mg/100 ml, 11.5 to 29 mg/100 ml, 11.5 to 22 mg/100 ml, 11.5 to 21 mg/100 ml, 11.5 to 20 mg/100 ml, 11.5 to 19 mg/100 ml, 11.5 to 18 mg/100 ml, 11.5 to 17 mg/100 ml, 11.5 to 16 mg/100 ml, 11.5 to 15 mg/100 ml, 11.5 to 14 mg/100 ml, 11.5 to 13 mg/100 ml, 11.5 to 12 mg/100 ml, 5.75 to 34.5 mg/100 ml, 5.75 to 28.75 mg/100 ml, 5.75 to 23 mg/100 ml, 5.75 to 17.25 mg/100 ml, 5.75 to 11.5 mg/100 ml, 11.5 to 34.5 mg/100 ml, 11.5 to 28.75 mg/100 ml, 11.5 to 23 mg/100 ml, 11.5 to 17.25 mg/100 ml, 17.25 to 34.5 mg/100 ml, 17.25 to 28.75 mg/100 ml, 17.25 to 23 mg/100 ml, 23 to 34.5 mg/100 ml, 23 to 28.75 mg/100 ml, or 28.75 to 34.5 mg/100 ml, depending on embodiments.

In addition, the amount of sodium that is added to a coffee beverage may be 0.1 to 50 mg/100 ml, 0.1 to 45 mg/100 ml, 0.1 to 40 mg/100 ml, 0.1 to 35 mg/100 ml, 0.1 to 30 mg/100 ml, 0.1 to 25 mg/100 ml, 0.1 to 20 mg/100 ml, 0.1 to 19 mg/100 ml, 0.1 to 18 mg/100 ml, 0.1 to 17 mg/100 ml, 0.1 to 16 mg/100 ml, 0.1 to 15 mg/100 ml, 0.1 to 14 mg/100 ml, 0.1 to 13 mg/100 ml, 0.1 to 12 mg/100 ml, 0.1 to 11 mg/100 ml, 0.1 to 10 mg/100 ml, 1 to 50 mg/100 ml, 1 to 45 mg/100 ml, 1 to 40 mg/100 ml, 1 to 35 mg/100 ml, 1 to 30 mg/100 ml, 1 to 25 mg/100 ml, 1 to 20 mg/100 ml, 1 to 19 mg/100 ml, 1 to 18 mg/100 ml, 1 to 17 mg/100 ml, 1 to 16 mg/100 ml, 1 to 15 mg/100 ml, 1 to 14 mg/100 ml, 1 to 13 mg/100 ml, 1 to 12 mg/100 ml, 1 to 11 mg/100 ml, 1 to 10 mg/100 ml, 5 to 50 mg/100 ml, 5 to 45 mg/100 ml, 5 to 40 mg/100 ml, 5 to 35 mg/100 ml, 5 to 30 mg/100 ml, 5 to 25 mg/100 ml, 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 50 mg/100 ml, 10 to 45 mg/100 ml, 10 to 40 mg/100 ml, 10 to 35 mg/100 ml, 10 to 30 mg/100 ml, 10 to 25 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 50 mg/100 ml, 15 to 45 mg/100 ml, 15 to 40 mg/100 ml, 15 to 35 mg/100 ml, 15 to 30 mg/100 ml, 15 to 25 mg/100 ml, 15 to 20 mg/100 ml, 20 to 50 mg/100 ml, 20 to 45 mg/100 ml, 20 to 40 mg/100 ml, 20 to 35 mg/100 ml, 20 to 30 mg/100 ml, 20 to 25 mg/100 ml, 25 to 50 mg/100 ml, 25 to 45 mg/100 ml, 25 to 40 mg/100 ml, 25 to 35 mg/100 ml, or 25 to 30 mg/100 ml.

Forms of sodium is not particularly limited provided that sodium in an ingestible state is contained in the coffee beverage of the present invention, and may be in at least one form selected from the group consisting of sodium chloride, sodium hydroxide, sodium malate, sodium sulfate, sodium citrate, sodium phosphate, sodium carbonate, sodium disulfide, sodium bicarbonate, sodium alginate, sodium argininate, sodium glucoheptanoate, sodium gluconate, sodium glutamate, sodium tartrate, sodium aspartate, sodium lactate, sodium caseinate, sodium ascorbate, and a mixture thereof, for example. In addition, sodium is also contained in coffee beans in some cases, and in such a case, sodium obtained when extracting coffee from coffee beans is included in the sodium contained in the coffee beverage of the present invention. In addition, when the pH of an extract liquid is adjusted using a pH adjuster in extraction of coffee, sodium contained in the pH adjuster is also included in the sodium in the coffee beverage. In addition, when a coffee beverage contains a milk component, such as milk, cow's milk, or a dairy product, sodium contained in the milk component is also encompassed. In an aspect of the present invention, sodium derived from a sodium component that is used as a preservative (e.g., sodium benzoate, sodium sulfite, sodium hyposulfite, sodium dehydroacetate, sodium pyrosulfite, or sodium propionate) is not substantially included in the component (c).

In the present specification, the sodium content in a beverage can be measured by atomic absorption spectrometry. Incidentally, when the amount of a sodium-containing compound contained in the beverage is known, the value calculated from the amount may be used.

The coffee beverage of the present invention has an enhanced sweetness as having been already mentioned. Whether or not the sweetness of the coffee beverage of the present invention is enhanced can be evaluated by panelists who received sensory trainings. Further, for the sweetness intensity X3 of the coffee beverage of the present invention, standard coffee beverages to be the sweetness standards are prepared with sucrose concentrations assigned as sweetness intensities 1, 2, 3, 4, 5, 6, 7, 8, 9, 10, 11, 12, 13, 14, and 15 and panelists compare the sweetness of the coffee beverage of the present invention with the sweetnesses of these standard coffee beverages thereby to measure the sweetness of the coffee beverage of the present invention. Note that the standard coffee beverages having a sweetness intensity of 1, 2, . . . 15 are prepared by adding sucrose in such a way that a sucrose content is 1 g/100 g, 2 g/100 g, . . . 15 g/100 g to the coffee beverage to which sucrose is not added.

Furthermore, of the standard coffee beverages having a lower sweetness than the coffee beverage of the present invention in the above measurement, the standard coffee beverage having the closest sweetness to that of the coffee beverage of the present invention is selected and adjusted in such a way as to have the same sweetness as that of the coffee beverage of the present invention by adding sucrose to the selected standard coffee beverage, during which a sweetness intensity X3 of the coffee beverage of the present invention can also be measured from a sucrose content in the adjusted standard coffee beverage.

Other examples of the method for measuring a sweetness of the coffee beverage of the present invention include a sweetness intensity rating using Visual Analogue Scale (VAS method). For the VAS method, literatures in The journal of Japanese Society of Stomatognathic Function (2014) 20 pp. 115-129 ("Construction of a Screening Test for Gustatory Function in Four Basic Tastes" by Toyota et al.) and the like can be referred. Specifically, in the measurement of sweetness intensity by the VAS method, for example, evaluators define sweetness intensities as "not sweet at all" at the lower end and "nothing is sweeter than this" at the upper end and, using a piece of paper on which a vertical line indicating the intensities of sweetness on the straight line, assess a sweetness intensity sensed at that time by showing a position on the straight line.

X3 may be 4.0 to 20, 4.0 to 15, 4.0 to 12.5, 4.0 to 10, 4.5 to 20, 4.5 to 15, 4.5 to 12.5, 4.5 to 10, 5.0 to 20, 5.0 to 15, 5.0 to 12.5, 5.0 to 10, 5.5 to 20, 5.5 to 15, 5.5 to 12.5, 5.5 to 10, 6.0 to 20, 6.0 to 15, 6.0 to 12.5, 6.0 to 10, 6.5 to 20, 6.5 to 15, 6.5 to 12.5, 6.5 to 10, 7.0 to 20, 7.0 to 15, 7.0 to 12.5, 7.0 to 10, 7.5 to 20, 7.5 to 15, 7.5 to 12.5, 7.5 to 10, 7.5 to 9, 7.5 to 8, 8.0 to 20, 8.0 to 20, 8.0 to 15, 8.0 to 12.5, 8.0 to 10, 8.5 to 20, 8.5 to 15, 8.5 to 12.5, 8.5 to 10, 9.0 to 20, 9.0 to 15, 9.0 to 12.5, 9.0 to 10, 9.5 to 20, 9.5 to 15, 9.5 to 12.5, 9.5 to 10, 10.0 to 20, 10.0 to 15, 10.0 to 12.5, 10.5 to 20, 10.5 to 15, or 10.5 to 12.5. Alternatively, X3 may be 4.0 to 18, 4.0 to 16, 4.0 to 15.5, 4.0 to 14, 4.5 to 18, 4.5 to 16, 4.5 to 15.5, 4.5 to 14, 5.0 to 18, 5.0 to 16, 5.0 to 15.5, 5.0 to 14, 5.5 to 18, 5.5 to 16, 5.5 to 15.5, 5.5 to 14, 6.0 to 18, 6.0 to 16, 6.0 to 15.5, 6.0 to 14, 6.5 to 18, 6.5 to 16, 6.5 to 15.5, 6.5 to 14, 7.0 to 18, 7.0 to 16, 7.0 to 15.5, 7.0 to 14, 7.5 to 18, 7.5 to 16, 7.5 to 15.5, 7.5 to 14, 7.5 to 9, 7.5 to 8, 8.0 to 18, 8.0 to 18, 8.0 to 16, 8.0 to 15.5, 8.0 to 14, 8.5 to 18, 8.5 to 16, 8.5 to 15.5, 8.5 to 14, 9.0 to 18, 9.0 to 16, 9.0 to 15.5, 9.0 to 14, 9.5 to 18, 9.5 to 16, 9.5 to 15.5, 9.5 to 14, 10.0 to 18, 10.0 to 16, 10.0 to 15.5, 10.5 to 18, 10.5 to 16, or 10.5 to 15.5.

In a certain embodiment, the coffee beverage of the present invention is a coffee beverage comprising:
(a) a natural sugar in an amount corresponding to a sweetness intensity X1 of 0.1 to 5;
(b) a high-intensity sweetener in an amount corresponding to a sweetness intensity X2 of 0.1 to 5; and
(c) 5 to 90 mg/100 ml of sodium,
wherein sweetness of a sweetness intensity X3 of 5.5 to 12.5 is exhibited by the components (a) to (c).

In another embodiment, the coffee beverage of the present invention is a coffee beverage comprising:
(a) a natural sugar in an amount corresponding to a sweetness intensity X1 of 3 to 5;
(b) a high-intensity sweetener in an amount corresponding to a sweetness intensity X2 of 1 to 5; and
(c) 25 to 40 mg/100 ml of sodium,
wherein sweetness of a sweetness intensity X3 of 5.5 to 12.5 is exhibited by the components (a) to (c). Preferably, the coffee beverage of the present invention further has an energy of 50 Kcal/100 ml or less, and X1+X2 is 6 or more.

In the coffee beverage of the present invention, the sweetness intensity X1 of the natural sugar, the sweetness intensity X2 of the high-intensity sweetener, the sodium content, the sweetness intensity X3 exhibited by the coffee beverage, and the energy of the coffee beverage may be any values as long as 0.1<(X1+X2)≤20 is satisfied. For example, it is also possible to combine any of the numerical values of the following sweetness intensity X1, sweetness intensity X2, sodium content, sweetness intensity X3, and energy.

"The sweetness intensity X1": 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.5 to 2.0, 1.5 to 2.5, 1.5 to 3.0, 1.5 to 3.5, 1.5 to 4.0, 1.5 to 4.5, 1.5 to 5.0, 2.0 to 2.5, 2.0 to 3.0, 2.0 to 3.5, 2.0 to 4.0, 2.0 to 4.5, 2.0 to 5.0, 2.5 to 3.0, 2.5 to 3.5, 2.5 to 4.0, 2.5 to 4.5, 2.5 to 5.0, 3.0 to 3.5, 3.0 to 4.0, 3.0 to 4.5, or 3.0 to 5.0.

"The sweetness intensity X2": 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.5 to 2.0, 1.5 to 2.5, 1.5 to 3.0, 1.5 to 3.5, 1.5 to 4.0, 1.5 to 4.5, 1.5 to 5.0, 2.0 to 2.5, 2.0 to 3.0, 2.0 to 3.5, 2.0 to 4.0, 2.0 to 4.5, 2.0 to 5.0, 2.5 to 3.0, 2.5 to 3.5, 2.5 to 4.0, 2.5 to 4.5, 2.5 to 5.0, 3.0 to 3.5, 3.0 to 4.0, 3.0 to 4.5, or 3.0 to 5.0.

"The amount of sodium": 5 to 90 mg/100 ml, 5 to 85 mg/100 ml, 5 to 80 mg/100 ml, 5 to 75 mg/100 ml, 5 to 70 mg/100 ml, 5 to 65 mg/100 ml, 5 to 60 mg/100 ml, 5 to 55 mg/100 ml, 5 to 50 mg/100 ml, 5 to 45 mg/100 ml, 5 to 40 mg/100 ml, 5 to 35 mg/100 ml, 5 to 30 mg/100 ml, 5 to 25 mg/100 ml, 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 90 mg/100 ml, 10 to 85 mg/100 ml, 10 to 80 mg/100 ml, 10 to 75 mg/100 ml, 10 to 70 mg/100 ml, 10 to 65 mg/100 ml, 10 to 60 mg/100 ml, 10 to 55 mg/100 ml, 10 to 50 mg/100 ml, 10 to 45 mg/100 ml, 10 to 40 mg/100 ml, 10 to 35 mg/100 ml, 10 to 30 mg/100 ml, 10 to 25 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 90 mg/100 ml, 15 to 85 mg/100 ml, 15 to 80 mg/100 ml, 15 to 75 mg/100 ml, 15 to 70 mg/100 ml, 15 to 65 mg/100 ml, 15 to 60 mg/100 ml, 15 to 55 mg/100 ml, 15 to 50 mg/100 ml, 15 to 45 mg/100 ml, 15 to 40 mg/100 ml, 15 to 35 mg/100 ml, 15 to 30 mg/100 ml, 15 to 25 mg/100 ml, or 15 to 20 mg/100 ml.

"The sweetness intensity X3": 4.0 to 20, 4.0 to 15, 4.0 to 12.5, 4.0 to 10, 4.5 to 20, 4.5 to 15, 4.5 to 12.5, 4.5 to 10, 5.0 to 20, 5.0 to 15, 5.0 to 12.5, 5.0 to 10, 5.5 to 20, 5.5 to 15, 5.5 to 12.5, 5.5 to 10, 6.0 to 20, 6.0 to 15, 6.0 to 12.5, 6.0 to 10, 6.5 to 20, 6.5 to 15, 6.5 to 12.5, 6.5 to 10, 7.0 to 20, 7.0 to 15, 7.0 to 12.5, 7.0 to 10, 7.5 to 20, 7.5 to 15, 7.5 to 12.5, 7.5 to 10, 7.5 to 9, 7.5 to 8, 8.0 to 20, 8.0 to 20, 8.0 to 15, 8.0 to 12.5, 8.0 to 10, 8.5 to 20, 8.5 to 15, 8.5 to 12.5, 8.5 to 10, 9.0 to 20, 9.0 to 15, 9.0 to 12.5, 9.0 to 10, 9.5 to 20, 9.5 to 15, 9.5 to 12.5, 9.5 to 10, 10.0 to 20, 10.0 to 15, 10.0 to 12.5, 10.5 to 20, 10.5 to 15, or 10.5 to 12.5.

The energy: 0 to 50 Kcal/100 ml, 0 to 45 Kcal/100 ml, 0 to 40 Kcal/100 ml, 0 to 35 Kcal/100 ml, 0 to 30 Kcal/100 ml, 0 to 25 Kcal/100 ml, 0 to 20 Kcal/100 ml, 0 to 15 Kcal/100 ml, 0 to 10 Kcal/100 ml, 0 to 5 Kcal/100 ml, 5 to 50 Kcal/100 ml, 5 to 45 Kcal/100 ml, 5 to 40 Kcal/100 ml, 5 to 35 Kcal/100 ml, 5 to 30 Kcal/100 ml, 5 to 25 Kcal/100 ml, 5 to 20 Kcal/100 ml, 5 to 15 Kcal/100 ml, 5 to 10 Kcal/100 ml, 10 to 50 Kcal/100 ml, 10 to 45 Kcal/100 ml, 10 to 40 Kcal/100 ml, 10 to 35 Kcal/100 ml, 10 to 30 Kcal/100 ml, 10 to 25 Kcal/100 ml, 10 to 20 Kcal/100 ml, 10 to 15 Kcal/100 ml, 15 to 50 Kcal/100 ml, 15 to 45 Kcal/100 ml, 15 to 40 Kcal/100 ml, 15 to 35 Kcal/100 ml, 15 to 30 Kcal/100 ml, 15 to 25 Kcal/100 ml, 15 to 20 Kcal/100 ml, 20 to 50 Kcal/100 ml, 20 to 45 Kcal/100 ml, 20 to 40 Kcal/100 ml, 20 to 35 Kcal/100 ml, 20 to 30 Kcal/100 ml, 20 to 25 Kcal/100 ml, 25 to 50 Kcal/100 ml, 25 to 45 Kcal/100 ml, 25 to 40 Kcal/100 ml, 25 to 35 Kcal/100 ml, or 25 to 30 Kcal/100 ml.

In addition, in the coffee beverage of the present invention, the sweetness intensity X1 of the natural sugar, the sweetness intensity X2 of the high-intensity sweetener, the sodium content, the sweetness intensity X3 exhibited by the coffee beverage, and the energy of the coffee beverage are not limited to the combinations of the above-mentioned numerical values, and any of the numerical values of the sweetness intensity X1, the sweetness intensity X2, the sodium content, the sweetness intensity X3, and the energy described in the present specification can be combined within a range of satisfying $0.1<(X1+X2)\leq20$.

The coffee beverage of the present invention can appropriately contain, for example, an antioxidant (e.g., sodium erythorbate), an emulsifier (e.g., sucrose esters of fatty acids, sorbitan esters of fatty acids, and polyglycerin esters of fatty acids), and a flavoring agent (e.g., a coffee flavoring agent), as long as the effects of the present invention are not impaired.

In a specific aspect, the present invention provides the following coffee beverage (hereinafter, referred to as "the coffee beverage A of the present invention").

A coffee beverage comprising:
(a) a natural sugar in an amount corresponding to a sweetness intensity X1;
(b) a high-intensity sweetener selected from the group consisting of rebaudioside M, rebaudioside D, and a combination thereof in an amount corresponding to a sweetness intensity X2; and
(c) 5 to 90 mg/100 ml of sodium,
wherein sweetness of a sweetness intensity X3 is exhibited by the components (a) to (c), and $0.1<(X1+X2)\leq20$ is satisfied.

In the coffee beverage A of the present invention, preferable ranges of the sweetness intensity X1, the sweetness intensity X2, the sodium content, the sweetness intensity X3, the concentration P2 of the high-intensity sweetener, and the energy are, for example, as follows. These numerical values can be arbitrarily combined within a range of satisfying $0.1<(X1+X2)\leq20$.

"The sweetness intensity X1": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.05 to 6.0, 0.05 to 6.5, 0.05 to 7.0, 0.05 to 7.5, 0.05 to 8.0, 0.05 to 8.25, 0.05 to 8.5, 0.05 to 8.75, 0.05 to 9.0, 0.05 to 9.25, 0.05 to 9.5, 0.05 to 9.75, 0.05 to 10.0, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.1 to 5.9, 0.1 to 6.0, 0.1 to 6.5, 0.1 to 7.0, 0.1 to 7.5, 0.1 to 8.0, 0.1 to 8.25, 0.1 to 8.5, 0.1 to 8.75, 0.1 to 9.0, 0.1 to 9.25, 0.1 to 9.5, 0.1 to 9.75, 0.1 to 10.0, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 0.5 to 6.0, 0.5 to 6.5, 0.5 to 7.0, 0.5 to 7.5, 0.5 to 8.0, 0.5 to 8.25, 0.5 to 8.5, 0.5 to 8.75, 0.5 to 9.0, 0.5 to 9.25, 0.5 to 9.5, 0.5 to 9.75, 0.5 to 10.0, 1.0 to 0.5, 1.0 to 1.0, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.0 to 6.0, 1.0 to 6.5, 1.0 to 7.0, 1.0 to 7.5, 1.0 to 8.0, 1.0 to 8.25, 1.0 to 8.5, 1.0 to 8.75, 1.0 to 9.0, 1.0 to 9.25, 1.0 to 9.5, 1.0 to 9.75, 1.0 to 10.0, 1.5 to 0.5, 1.5 to 1.0, 1.5 to 1.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 1.5 to 6.0, 1.5 to 6.5, 1.5 to 7.0, 1.5 to 7.5, 1.5 to 8.0, 1.5 to 8.25, 1.5 to 8.5, 1.5 to 8.75, 1.5 to 9.0, 1.5 to 9.25, 1.5 to 9.5, 1.5 to 9.75, 1.5 to 10.0, 2.0 to 0.5, 2.0 to 1.0, 2.0 to 1.5, 2.0 to 2.0, 2.0 to 2.5, 2.0 to 3.0, 2.0 to 3.5, 2.0 to 4.0, 2.0 to 4.5, 2.0 to 5.0, 2.0 to 5.5, 2.0 to 6.0, 2.0 to 6.5, 2.0 to 7.0, 2.0 to 7.5, 2.0 to 8.0, 2.0 to 8.25, 2.0 to 8.5, 2.0 to 8.75, 2.0 to 9.0, 2.0 to 9.25, 2.0 to 9.5, 2.0 to 9.75, 2.0 to 10.0, 2.5 to 0.5, 2.5 to 1.0, 2.5 to 1.5, 2.5 to 2.0, 2.5 to 2.5, 2.5 to 3.0, 2.5 to 3.5, 2.5 to 4.0, 2.5 to 4.5, 2.5 to 5.0, 2.5 to 5.5, 2.5 to 6.0, 2.5 to 6.5, 2.5 to 7.0, 2.5 to 7.5, 2.5 to 8.0, 2.5 to 8.25, 2.5 to 8.5, 2.5 to 8.75, 2.5 to 9.0, 2.5 to 9.25, 2.5 to 9.5, 2.5 to 9.75, or 2.5 to 10.0. More preferably, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.1 to 5.9, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"The sweetness intensity X2": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, 3.0 to 5.5, 2.0 to 6.5, 2.0 to 7.0, 2.0 to 7.5, 2.0 to 6.0, 2.5 to 7.0, 2.5 to 7.5, 2.5 to 6.0, 2.5 to 6.5, 3.0 to 6.0, 3.0 to 6.5, 3.0 to 7.0, 3.0 to 7.5, 3.0 to 8.0, 3.0 to 8.5, 3.0 to 9.0, 3.0 to 9.5, 3.5 to 7.0, 3.5 to 7.5, 3.5 to 8.0, 4.5 to 8.5, 3.5 to 9.0, 3.5 to 9.5, 4.0 to 7.5, 4.0 to 8.0, 4.0 to 8.5, 4.0 to 9.0, 4.0 to 9.5, 3.5 to 8.5, 3.5 to 10.0, 3.5 to 10.5, 3.5 to 11.0, 3.5 to 11.5, 4.0 to 11.5, 0.05 to 6.0, 0.05 to 6.5, 0.05 to 7.0, 0.05 to 7.5, 0.05 to 8.0, 0.05 to 8.5, 0.05 to 9.0, 0.05 to 9.5, 0.05 to 10.0, 0.05 to 10.5, 0.05 to 11.0, 0.05 to 11.5, 0.5 to 6.0, 0.5 to 6.5, 0.5 to 7.0, 0.5 to 7.5, 0.5 to 8.0, 0.5 to 8.5, 0.5 to 9.0, 0.5 to 9.5, 0.5 to 10.0, 0.5 to 10.5, 0.5 to 11.0, 0.5 to 11.5, 1.0 to 6.0, 1.0 to 6.5, 1.0 to 7.0, 1.0 to 7.5, 1.0 to 8.0, 1.0 to 8.5, 1.0 to 9.0, 1.0 to 9.5, 1.0 to 10.0, 1.0 to 10.5, 1.0 to 11.0, 1.0 to 11.5, 1.5 to 6.0, 1.5 to 6.5, 1.5 to 7.0, 1.5 to 7.5, 1.5 to 8.0, 1.5 to 8.5, 1.5 to 9.0, 1.5 to 9.5, 1.5 to 10.0, 1.5 to 10.5, 1.5 to 11.0, 1.5 to 11.5, 2.0 to 8.0, 2.0 to 8.5, 2.0 to 9.0, 2.0 to 9.5, 2.0 to 10.0, 2.0 to 10.5, 2.0 to 11.0, 2.0 to 11.5, 2.5 to 8.0, 2.5 to 8.5, 2.5 to 9.0, 2.5 to 9.5, 2.5 to 10.0, 2.5 to 10.5, 2.5 to 11.0, 2.5 to 11.5, 3.0 to 10.0, 3.0 to 10.5, 3.0 to 11.0, 3.0 to 11.5, 3.5 to 4.0, 3.5 to 4.5, 3.5 to 5.0, 3.5 to 5.5, 3.5 to 6.0, 3.5 to 6.5, 4.0 to 4.5, 4.0 to 5.0, 4.0 to 5.5, 4.0 to 6.0, 4.0 to 6.5, 4.0 to 7.0, 4.0 to 10.0, 4.0 to 10.5, or 4.0 to 11.0. More preferably, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"The amount of sodium": 5 to 90 mg/100 ml, 5 to 85 mg/100 ml, 5 to 80 mg/100 ml, 5 to 75 mg/100 ml, 5 to 70 mg/100 ml, 5 to 65 mg/100 ml, 5 to 60 mg/100 ml, 5 to 55 mg/100 ml, 5 to 50 mg/100 ml, 5 to 45 mg/100 ml, 5 to 40 mg/100 ml, 5 to 35 mg/100 ml, 5 to 30 mg/100 ml, 5 to 25 mg/100 ml, 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 90 mg/100 ml, 10 to 85 mg/100 ml, 10 to 80 mg/100 ml, 10 to 75 mg/100 ml, 10 to 70 mg/100 ml, 10 to 65 mg/100 ml, 10 to 60 mg/100 ml, 10 to 55 mg/100 ml, 10 to 50 mg/100 ml, 10 to 45 mg/100 ml, 10 to 40 mg/100 ml, 10 to 35 mg/100 ml, 10 to 30 mg/100 ml, 10 to 25 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 90 mg/100 ml, 15 to 85 mg/100 ml, 15 to 80 mg/100 ml, 15 to 75 mg/100 ml, 15 to 70 mg/100 ml, 15 to 65 mg/100 ml, 15 to 60 mg/100 ml, 15 to 55 mg/100 ml, 15 to 50 mg/100 ml, 15 to 45 mg/100 ml, 15 to 40 mg/100 ml, 15 to 35 mg/100 ml, 15 to 30 mg/100 ml, 15 to 25 mg/100 ml, or 15 to 20 mg/100 ml.

"The sweetness intensity X3": 4.0 to 20, 4.0 to 15, 4.0 to 12.5, 4.0 to 10, 4.5 to 20, 4.5 to 15, 4.5 to 12.5, 4.5 to 10, 5.0 to 20, 5.0 to 15, 5.0 to 12.5, 5.0 to 10, 5.5 to 20, 5.5 to 15, 5.5 to 12.5, 5.5 to 10, 6.0 to 20, 6.0 to 15, 6.0 to 12.5, 6.0 to 10, 6.5 to 20, 6.5 to 15, 6.5 to 12.5, 6.5 to 10, 7.0 to 20, 7.0 to 15, 7.0 to 12.5, 7.0 to 10, 7.5 to 20, 7.5 to 15, 7.5 to 12.5, 7.5 to 10, 7.5 to 9, 7.5 to 8, 8.0 to 20, 8.0 to 20, 8.0 to 15, 8.0 to 12.5, 8.0 to 10, 8.5 to 20, 8.5 to 15, 8.5 to 12.5, 8.5 to 10, 9.0 to 20, 9.0 to 15, 9.0 to 12.5, 9.0 to 10, 9.5 to 20, 9.5 to 15, 9.5 to 12.5, 9.5 to 10, 10.0 to 20, 10.0 to 15, 10.0 to 12.5, 10.5 to 20, 10.5 to 15, or 10.5 to 12.5.

"The amount of a high intensity sweetener P2 (ppm)": 20 to 550, 25 to 550, 30 to 550, 35 to 550, 40 to 550, 45 to 550, 50 to 550, 55 to 550, 20 to 540, 25 to 540, 30 to 540, 35 to 540, 40 to 540, 45 to 540, 50 to 540, 55 to 540, 20 to 530, 25 to 530, 30 to 530, 35 to 530, 40 to 530, 45 to 530, 50 to 530, 55 to 530, 20 to 520, 25 to 520, 30 to 520, 35 to 520, 40 to 520, 45 to 520, 50 to 520, 55 to 520, 20 to 510, 25 to 510, 30 to 510, 35 to 510, 40 to 510, 45 to 510, 50 to 510, 55 to 510, 20 to 505, 25 to 505, 30 to 505, 35 to 505, 40 to 505, 45 to 505, 50 to 505, 55 to 505, 20 to 500, 25 to 500, 30 to 500, 35 to 500, 40 to 500, 45 to 500, 50 to 500, 55 to 500, 20 to 495, 25 to 495, 30 to 495, 35 to 495, 40 to 495, 45 to 495, 50 to 495, 55 to 495, 20 to 490, 25 to 490, 30 to 490, 35 to 490, 40 to 490, 45 to 490, 50 to 490, or 55 to 490.

The energy: 0 to 25 Kcal/100 ml, 0 to 20 Kcal/100 ml, 0 to 15 Kcal/100 ml, 0 to 10 Kcal/100 ml, 0 to 5 Kcal/100 ml, 5 to 25 Kcal/100 ml, 5 to 20 Kcal/100 ml, 5 to 15 Kcal/100 ml, 5 to 10 Kcal/100 ml, 10 to 25 Kcal/100 ml, 10 to 20 Kcal/100 ml, 10 to 15 Kcal/100 ml, 15 to 25 Kcal/100 ml, 15 to 20 Kcal/100 ml, 20 to 25 Kcal/100 ml, 0 to 24 Kcal/100 ml, 0 to 8 Kcal/100 ml, 0 to 4 Kcal/100 ml, 4 to 24 Kcal/100 ml, 4 to 8 Kcal/100 ml, or 8 to 24 Kcal/100 ml.

In the coffee beverage A of the present invention, the forms of the natural sugar (including examples of the combination of glucose, sucrose, fructose, maltose, oligo-saccharide, high-fructose corn syrup, or lactose) and sodium are defined as described in the section for the coffee beverage of the present invention.

In another specific aspect, the present invention provides the following coffee beverage (hereinafter, referred to as "the coffee beverage B of the present invention").

A coffee beverage comprising:
(a) a natural sugar in an amount corresponding to a sweetness intensity X1;
(b) a Luo han guo extract in an amount corresponding to a sweetness intensity X2; and
(c) 5 to 90 mg/100 ml of sodium,
wherein sweetness of a sweetness intensity X3 is exhibited by the components (a) to (c), and $0.1<(X1+X2)\leq 20$ is satisfied.

In the coffee beverage B of the present invention, preferable ranges of the sweetness intensity X1, the sweetness intensity X2, the sodium content, the sweetness intensity X3, the content P2 of the Luo han guo extract, and the energy are, for example, as follows. These numerical values can be arbitrarily combined within a range of satisfying $0.1<(X1+X2)\leq 20$.

"The sweetness intensity X1": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.05 to 6.0, 0.05 to 6.5, 0.05 to 7.0, 0.05 to 7.5, 0.05 to 8.0, 0.05 to 8.25, 0.05 to 8.5, 0.05 to 8.75, 0.05 to 9.0, 0.05 to 9.25, 0.05 to 9.5, 0.05 to 9.75, 0.05 to 10.0, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.1 to 5.9, 0.1 to 6.0, 0.1 to 6.5, 0.1 to 7.0, 0.1 to 7.5, 0.1 to 8.0, 0.1 to 8.25, 0.1 to 8.5, 0.1 to 8.75, 0.1 to 9.0, 0.1 to 9.25, 0.1 to 9.5, 0.1 to 9.75, 0.1 to 10.0, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 0.5 to 6.0, 0.5 to 6.5, 0.5 to 7.0, 0.5 to 7.5, 0.5 to 8.0, 0.5 to 8.25, 0.5 to 8.5, 0.5 to 8.75, 0.5 to 9.0, 0.5 to 9.25, 0.5 to 9.5, 0.5 to 9.75, 0.5 to 10.0, 1.0 to 0.5, 1.0 to 1.0, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.0 to 6.0, 1.0 to 6.5, 1.0 to 7.0, 1.0 to 7.5, 1.0 to 8.0, 1.0 to 8.25, 1.0 to 8.5, 1.0 to 8.75, 1.0 to 9.0, 1.0 to 9.25, 1.0 to 9.5, 1.0 to 9.75, 1.0 to 10.0, 1.5 to 0.5, 1.5 to 1.0, 1.5 to 1.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 1.5 to 6.0, 1.5 to 6.5, 1.5 to 7.0, 1.5 to 7.5, 1.5 to 8.0, 1.5 to 8.25, 1.5 to 8.5, 1.5 to 8.75, 1.5 to 9.0, 1.5 to 9.25, 1.5 to 9.5, 1.5 to 9.75, 1.5 to 10.0, 2.0 to 0.5, 2.0 to 1.0, 2.0 to 1.5, 2.0 to 2.0, 2.0 to 2.5, 2.0 to 3.0, 2.0 to 3.5, 2.0 to 4.0, 2.0 to 4.5, 2.0 to 5.0, 2.0 to 5.5, 2.0 to 6.0, 2.0 to 6.5, 2.0 to 7.0, 2.0 to 7.5, 2.0 to 8.0, 2.0 to 8.25, 2.0 to 8.5, 2.0 to 8.75, 2.0 to 9.0, 2.0 to 9.25, 2.0 to 9.5, 2.0 to 9.75, 2.0 to 10.0, 2.5 to 0.5, 2.5 to 1.0, 2.5 to 1.5, 2.5 to 2.0, 2.5 to 2.5, 2.5 to 3.0, 2.5 to 3.5, 2.5 to 4.0, 2.5 to 4.5, 2.5 to 5.0, 2.5 to 5.5, 2.5 to 6.0, 2.5 to 6.5, 2.5 to 7.0, 2.5 to 7.5, 2.5 to 8.0, 2.5 to 8.25, 2.5 to 8.5, 2.5 to 8.75, 2.5 to 9.0, 2.5 to 9.25, 2.5 to 9.5, 2.5 to 9.75, 2.5 to 10.0, 0 to 10.5, 0 to 11.0, 0 to 11.5, 0 to 12.0, 0 to 12.5, 0 to 13.0, 0 to 13.5, 0 to 14.0, 0 to 14.5, 0 to 15.0, 0.05 to 10.5, 0.05 to 11.0, 0.05 to 11.5, 0.05 to 12.0, 0.05 to 12.5, 0.05 to 13.0, 0.05 to 13.5, 0.05 to 14.0, 0.05 to 14.5, 0.05 to 15.0, 0.1 to 10.5, 0.1 to 11.0, 0.1 to 11.5, 0.1 to 12.0, 0.1 to 12.5, 0.1 to 13.0, 0.1 to 13.5, 0.1 to 14.0, 0.1 to 14.5, 0.1 to 15.0, 0.5 to 10.5, 0.5 to 11.0, 0.5 to 11.5, 0.5 to 12.0, 0.5 to 12.5, 0.5 to 13.0, 0.5 to 13.5, 0.5 to 14.0, 0.5 to 14.5, 0.5 to 15.0, 1.0 to 10.5, 1.0 to 11.0, 1.0 to 11.5, 1.0 to 12.0, 1.0 to 12.5, 1.0 to 13.0, 1.0 to 13.5, 1.0 to 14.0, 1.0 to 14.5, 1.0 to 15.0, 1.5 to 10.5, 1.5 to 11.0, 1.5 to 11.5, 1.5 to 12.0, 1.5 to 12.5, 1.5 to 13.0, 1.5 to 13.5, 1.5 to 14.0, 1.5 to 14.5, 1.5 to 15.0, 2.0 to 10.5, 2.0 to 11.0, 2.0 to 11.5, 2.0 to 12.0, 2.0 to 12.5, 2.0 to 13.0, 2.0 to 13.5, 2.0 to 14.0, 2.0 to 14.5, 2.0 to 15.0, 2.5 to 10.5, 2.5 to 11.0, 2.5 to 11.5, 2.5 to 12.0, 2.5 to 12.5, 2.5 to 13.0, 2.5 to 13.5, 2.5 to 14.0, 2.5 to 14.5, or 2.5 to 15.0. More preferably, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.1 to 5.9, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"The sweetness intensity X2": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, 3.0 to 5.5, 2.0 to 6.5, 2.0 to 7.0, 2.0 to 7.5, 2.0 to 6.0, 2.0 to 6.5, 2.0 to 7.0, 2.0 to 7.5, 2.5 to 7.0, 2.5 to 7.5, 2.5 to 6.0, 2.5 to 6.5, 2.5 to 7.0, 2.5 to 7.5, 3.0 to 7.5, 3.0 to 6.0, 3.0 to 6.5, 3.0 to 7.0, 3.0 to 7.5, 3.0 to 8.0, 3.0 to 8.5, 3.0 to 9.0, 3.0 to 9.5, 3.5 to 7.0, 3.5 to 7.5, 3.5 to 8.0, 4.5 to 8.5, 3.5 to 9.0, 3.5 to 9.5, 4.0 to 7.5, 4.0 to 8.0, 4.0 to 8.5, 4.0 to 9.0, 4.0 to 9.5, 3.5 to 8.5, 3.5 to 9.0, 3.5 to 9.5, 3.5 to 10.0, 3.5 to 10.5, 3.5 to 11.0, 3.5 to 11.5, 4.0 to 11.5, 0.05 to 6.0, 0.05 to 6.5, 0.05 to 7.0, 0.05 to 7.5, 0.05 to 8.0, 0.05 to 8.5, 0.05 to 9.0, 0.05 to 9.5, 0.05 to 10.0, 0.05 to 10.5, 0.05 to 11.0, 0.05 to 11.5, 0.05 to 12.0, 0.05 to 13.0, 0.05 to 14.0, 0.05 to 15.0, 0.05 to 16.0, 0.05 to 17.0, 0.05 to 18.0, 0.5 to 6.0, 0.5 to 6.5, 0.5 to 7.0, 0.5 to 7.5, 0.5 to 8.0, 0.5 to 8.5, 0.5 to 9.0, 0.5 to 9.5, 0.5 to 10.0, 0.5 to 10.5, 0.5 to 11.0, 0.5 to 11.5, 0.5 to 12.0, 0.5 to 13.0, 0.5 to 14.0, 0.5 to 15.0, 0.5 to 16.0, 0.5 to 17.0, 0.5 to 18.0, 1.0 to 6.0, 1.0 to 6.5, 1.0 to 7.0, 1.0 to 7.5, 1.0 to 8.0, 1.0 to 8.5, 1.0 to 9.0, 1.0 to 9.5, 1.0 to 10.0, 1.0 to 10.5, 1.0 to 11.0, 1.0 to 11.5, 1.0 to 12.0, 1.0 to 13.0, 1.0 to 14.0, 1.0 to 15.0, 1.0 to 16.0, 1.0 to 17.0, 1.0 to 18.0, 1.5 to 6.0, 1.5 to 6.5, 1.5 to 7.0, 1.5 to 7.5, 1.5 to 8.0, 1.5 to 8.5, 1.5 to 9.0, 1.5 to 9.5, 1.5 to 10.0, 1.5 to 10.5, 1.5 to 11.0, 1.5 to 11.5, 1.5 to 12.0, 1.5 to 13.0, 1.5 to 14.0, 1.5 to 15.0, 1.5 to 16.0, 1.5 to 17.0, 1.5 to 18.0, 2.0 to 8.0, 2.0 to 8.5, 2.0 to 9.0, 2.0 to 9.5, 2.0 to 10.0, 2.0 to 10.5, 2.0 to 11.0, 2.0 to 11.5, 2.0 to 12.0, 2.0 to 13.0, 2.0 to 14.0, 2.0 to 15.0, 2.0 to 16.0, 2.0 to 17.0, 2.0 to 18.0, 2.5 to 8.0, 2.5 to 8.5, 2.5 to 9.0, 2.5 to 9.5, 2.5 to 10.0, 2.5 to 10.5, 2.5 to 11.0, 2.5 to 11.5, 2.5 to 12.0, 2.5 to 13.0, 2.5 to 14.0, 2.5 to 15.0, 2.5 to 16.0, 2.5 to 17.0, 2.5 to 18.0, 3.0 to 10.0, 3.0 to 10.5, 3.0 to 11.0, 3.0 to 11.5, 3.0 to 12.0, 3.0 to 13.0, 3.0 to 14.0, 3.0 to 15.0, 3.0 to 16.0, 3.0 to 17.0, 3.0 to 18.0, 3.5 to 4.0, 3.5 to 4.5, 3.5 to 5.0, 3.5 to 5.5, 3.5 to 6.0, 3.5 to 6.5, 3.5 to 12.0, 3.5 to 13.0, 3.5 to 14.0, 3.5 to 15.0, 3.5 to 16.0, 3.5 to 17.0, 3.5 to 18.0, 4.0 to 4.5, 4.0 to 5.0, 4.0 to 5.5, 4.0 to 6.0, 4.0 to 6.5, 4.0 to 7.0, 4.0 to 10.0, 4.0 to 10.5, 4.0 to 11.0, 4.0 to 12.0, 4.0 to 13.0, 4.0 to 14.0, 4.0 to 15.0, 4.0 to 16.0, 4.0 to 17.0, or 4.0 to 18.0. More preferably, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"The amount of sodium": 5 to 90 mg/100 ml, 5 to 85 mg/100 ml, 5 to 80 mg/100 ml, 5 to 75 mg/100 ml, 5 to 70 mg/100 ml, 5 to 65 mg/100 ml, 5 to 60 mg/100 ml, 5 to 55 mg/100 ml, 5 to 50 mg/100 ml, 5 to 45 mg/100 ml, 5 to 40 mg/100 ml, 5 to 35 mg/100 ml, 5 to 30 mg/100 ml, 5 to 25 mg/100 ml, 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 90 mg/100 ml, 10 to 85 mg/100 ml, 10 to 80 mg/100 ml, 10 to 75 mg/100 ml, 10 to 70 mg/100 ml, 10 to 65 mg/100 ml, 10 to 60 mg/100 ml, 10 to 55 mg/100 ml, 10 to 50 mg/100 ml, 10 to 45 mg/100 ml, 10 to 40 mg/100 ml, 10 to 35 mg/100 ml, 10 to 30 mg/100 ml, 10 to 25 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 90 mg/100 ml, 15 to 85 mg/100 ml, 15 to 80 mg/100 ml, 15 to 75 mg/100 ml, 15 to 70 mg/100 ml, 15 to 65 mg/100 ml, 15 to 60 mg/100 ml, 15 to 55 mg/100 ml, 15 to 50 mg/100 ml, 15 to 45 mg/100 ml, 15 to 40 mg/100 ml, 15 to 35 mg/100 ml, 15 to 30 mg/100 ml, 15 to 25 mg/100 ml, 15 to 20 mg/100 ml, 5 to 34 mg/100 ml, 5 to 33 mg/100 ml, 5 to 32 mg/100 ml, 5 to 31 mg/100 ml, 5 to 29 mg/100 ml, 5 to 22 mg/100 ml, 5 to 21 mg/100 ml, 10 to 34 mg/100 ml, 10 to 33 mg/100 ml, 10 to 32 mg/100 ml, 10 to 31 mg/100 ml, 10 to 29 mg/100 ml, 10 to 22 mg/100 ml, 10 to 21 mg/100 ml, 11.5 to 34 mg/100 ml, 11.5 to 33 mg/100 ml, 11.5 to 32 mg/100 ml, 11.5 to 31 mg/100 ml, 11.5 to 30 mg/100 ml, 11.5 to 29 mg/100 ml, 11.5 to 22 mg/100 ml, 11.5 to 21 mg/100 ml, 11.5 to 20 mg/100 ml, 11.5 to 19 mg/100 ml, 11.5 to 18 mg/100 ml, 11.5 to 17 mg/100 ml, 11.5 to 16 mg/100 ml, 11.5 to 15 mg/100 ml, 11.5 to 14 mg/100 ml, 11.5 to 13 mg/100 ml, 11.5 to 12 mg/100 ml, 5.75 to 28.75 mg/100 ml, 5.75 to 23 mg/100 ml, 5.75 to 17.25 mg/100 ml, 5.75 to 11.5 mg/100 ml, 11.5 to 28.75 mg/100 ml, 11.5 to 23 mg/100 ml, 11.5 to 17.25 mg/100 ml, 17.25 to 28.75 mg/100 ml, 17.25 to 23 mg/100 ml, or 23 to 28.75 mg/100 ml.

"The sweetness intensity X3": 4.0 to 20, 4.0 to 15, 4.0 to 12.5, 4.0 to 10, 4.5 to 20, 4.5 to 15, 4.5 to 12.5, 4.5 to 10, 5.0 to 20, 5.0 to 15, 5.0 to 12.5, 5.0 to 10, 5.5 to 20, 5.5 to 15, 5.5 to 12.5, 5.5 to 10, 6.0 to 20, 6.0 to 15, 6.0 to 12.5, 6.0 to 10, 6.5 to 20, 6.5 to 15, 6.5 to 12.5, 6.5 to 10, 7.0 to 20, 7.0 to 15, 7.0 to 12.5, 7.0 to 10, 7.5 to 20, 7.5 to 15, 7.5 to 12.5, 7.5 to 10, 7.5 to 9, 7.5 to 8, 8.0 to 20, 8.0 to 20, 8.0 to 15, 8.0 to 12.5, 8.0 to 10, 8.5 to 20, 8.5 to 15, 8.5 to 12.5, 8.5 to 10, 9.0 to 20, 9.0 to 15, 9.0 to 12.5, 9.0 to 10, 9.5 to 20, 9.5 to 15, 9.5 to 12.5, 9.5 to 10, 10.0 to 20, 10.0 to 15, 10.0 to 12.5, 10.5 to 20, 10.5 to 15, 10.5 to 12.5, 4.0 to 18, 4.0 to 16, 4.0 to 15.5, 4.0 to 14, 4.5 to 18, 4.5 to 16, 4.5 to 15.5, 4.5 to 14, 5.0 to 18, 5.0 to 16, 5.0 to 15.5, 5.0 to 14, 5.5 to 18, 5.5 to 16, 5.5 to 15.5, 5.5 to 14, 6.0 to 18, 6.0 to 16, 6.0 to 15.5, 6.0 to 14, 6.5 to 18, 6.5 to 16, 6.5 to 15.5, 6.5 to 14, 7.0 to 18, 7.0 to 16, 7.0 to 15.5, 7.0 to 14, 7.5 to 18, 7.5 to 16, 7.5 to 15.5, 7.5 to 14, 7.5 to 9, 7.5 to 8, 8.0 to 18, 8.0 to 18, 8.0 to 16, 8.0 to 15.5, 8.0 to 14, 8.5 to 18, 8.5 to 16, 8.5 to 15.5, 8.5 to 14, 9.0 to 18, 9.0 to 16, 9.0 to 15.5, 9.0 to 14, 9.5 to 18, 9.5 to 16, 9.5 to 15.5, 9.5 to 14, 10.0 to 18, 10.0 to 16, 10.0 to 15.5, 10.5 to 18, 10.5 to 16, or 10.5 to 15.5.

"The amount of Luo han guo extract P2 (ppm)": 20 to 550, 25 to 550, 30 to 550, 35 to 550, 40 to 550, 45 to 550, 50 to 550, 55 to 550, 20 to 540, 25 to 540, 30 to 540, 35 to 540, 40 to 540, 45 to 540, 50 to 540, 55 to 540, 20 to 530, 25 to 530, 30 to 530, 35 to 530, 40 to 530, 45 to 530, 50 to 530, 55 to 530, 20 to 520, 25 to 520, 30 to 520, 35 to 520, 40 to 520, 45 to 520, 50 to 520, 55 to 520, 20 to 510, 25 to 510, 30 to 510, 35 to 510, 40 to 510, 45 to 510, 50 to 510, 55 to 510, 20 to 505, 25 to 505, 30 to 505, 35 to 505, 40 to 505, 45 to 505, 50 to 505, 55 to 505, 20 to 500, 25 to 500, 30 to 500, 35 to 500, 40 to 500, 45 to 500, 50 to 500, 55 to 500, 20 to 495, 25 to 495, 30 to 495, 35 to 495, 40 to 495, 45 to 495, 50 to 495, 55 to 495, 20 to 490, 25 to 490, 30 to 490, 35 to 490, 40 to 490, 45 to 490, 50 to 490, 55 to 490, 1 to 1500, 1 to 1200, 5 to 1200, 1 to 1000, 5 to 1000, 10 to 1000, 1 to 900, 5 to 900, 10 to 900, 15 to 900, 20 to 900, 25 to 900, 30 to 900, 35 to 900, 40 to 900, 45 to 900, 50 to 900, 55 to 900, 1 to 800, 5 to 800, 10 to 800, 15 to 800, 20 to 800, 25 to 800, 30 to 800, 35 to 800, 40 to 800, 45 to 800, 50 to 800, 55 to 800, 1 to 700, 5 to 700, 10 to 700, 15 to 700, 20 to 700, 25 to 700, 30 to 700, 35 to 700, 40 to 700, 45 to 700, 50 to 700, 55 to 700, 1 to 600, 5 to 600, 10 to 600, 15 to 600, 20 to 600, 25 to 600, 30 to 600, 35 to 600, 40 to 600, 45 to 600, 50 to 600, 55 to 600, 1 to 550, 1 to 540, 1 to 530, 1 to 520, 1 to 510, 1 to 505, 1 to 500, 1 to 495, 1 to 490, 5 to 550, 5 to 540, 5 to 530, 5 to 520, 5 to 510, 5 to 505, 5 to 500, 5 to 495, 5 to 490, 10 to 550, 10 to 540, 10 to 530, 10 to 520, 10 to 510, 10 to 505, 10 to 500, 10 to 495, 10 to 490, 15 to 550, 15 to 550, 15 to 530, 15 to 520, 15 to 510, 15 to 505, 15 to 500, 15 to 495, or 15 to 490.

The energy: 0 to 50 Kcal/100 ml, 0 to 45 Kcal/100 ml, 0 to 40 Kcal/100 ml, 0 to 35 Kcal/100 ml, 0 to 30 Kcal/100 ml, 0 to 25 Kcal/100 ml, 0 to 20 Kcal/100 ml, 0 to 15 Kcal/100 ml, 0 to 10 Kcal/100 ml, 0 to 5 Kcal/100 ml, 5 to 50 Kcal/100 ml, 5 to 45 Kcal/100 ml, 5 to 40 Kcal/100 ml, 5 to 35 Kcal/100 ml, 5 to 30 Kcal/100 ml, 5 to 25 Kcal/100 ml, 5 to 20 Kcal/100 ml, 5 to 15 Kcal/100 ml, 5 to 10 Kcal/100 ml, 10 to 50 Kcal/100 ml, 10 to 45 Kcal/100 ml, 10 to 40 Kcal/100 ml, 10 to 35 Kcal/100 ml, 10 to 30 Kcal/100 ml, 10 to 25 Kcal/100 ml, 10 to 20 Kcal/100 ml, 10 to 15 Kcal/100 ml, 15 to 50 Kcal/100 ml, 15 to 45 Kcal/100 ml, 15 to 40 Kcal/100 ml, 15 to 35 Kcal/100 ml, 15 to 30 Kcal/100 ml, 15 to 25 Kcal/100 ml, 15 to 20 Kcal/100 ml, 20 to 50 Kcal/100 ml, 20 to 45 Kcal/100 ml, 20 to 40 Kcal/100 ml, 20 to 35 Kcal/100 ml, 20 to 30 Kcal/100 ml, 20 to 25 Kcal/100 ml, 25 to 50 Kcal/100 ml, 25 to 45 Kcal/100 ml, 25 to 40 Kcal/100 ml, 25 to 35 Kcal/100 ml, 25 to 30 Kcal/100 ml, 0 to 32 Kcal/100 ml, 0 to 24 Kcal/100 ml, 0 to 8 Kcal/100 ml, 0 to 4 Kcal/100 ml, 4 to 32 Kcal/100 ml, 4 to 24 Kcal/100 ml, 4 to 8 Kcal/100 ml, 8 to 32 Kcal/100 ml, 8 to 24 Kcal/100 ml, or 24 to 32 Kcal/100 ml.

In addition, in the coffee beverage B of the present invention, the forms of the natural sugar (including examples of the combination of glucose, sucrose, fructose, maltose, oligosaccharide, high-fructose corn syrup, or lactose) and sodium are defined as described in the section for the coffee beverage of the present invention.

In another specific aspect, the present invention provides the following coffee beverage (hereinafter, referred to as "the coffee beverage C of the present invention").

A coffee beverage comprising:
(a) a natural sugar in an amount corresponding to a sweetness intensity X1;
(b) mogroside V in an amount corresponding to a sweetness intensity X2; and
(c) 5 to 90 mg/100 ml of sodium,
wherein sweetness of a sweetness intensity X3 is exhibited by the components (a) to (c), and $0.1<(X1+X2) \leq 20$ is satisfied.

In the coffee beverage C of the present invention, preferable ranges of the sweetness intensity X1, the sweetness intensity X2, the sodium content, the sweetness intensity X3, the content P2 (ppm) of mogroside V, and the energy are, for example, as follows. These numerical values can be arbitrarily combined within a range of satisfying $0.1<(X1+X2) \leq 20$.

"The sweetness intensity X1": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.05 to 6.0, 0.05 to 6.5, 0.05 to 7.0, 0.05 to 7.5, 0.05 to 8.0, 0.05 to 8.25, 0.05 to 8.5, 0.05 to 8.75, 0.05 to 9.0, 0.05 to 9.25, 0.05 to 9.5, 0.05 to 9.75, 0.05 to 10.0, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.1 to 5.9, 0.1 to 6.0, 0.1 to 6.5, 0.1 to 7.0, 0.1 to 7.5, 0.1 to 8.0, 0.1 to 8.25, 0.1 to 8.5, 0.1 to 8.75, 0.1 to 9.0, 0.1 to 9.25, 0.1 to 9.5, 0.1 to 9.75, 0.1 to 10.0, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 0.5 to 6.0, 0.5 to 6.5, 0.5 to 7.0, 0.5 to 7.5, 0.5 to 8.0, 0.5 to 8.25, 0.5 to 8.5, 0.5 to 8.75, 0.5 to 9.0, 0.5 to 9.25, 0.5 to 9.5, 0.5 to 9.75, 0.5 to 10.0, 1.0 to 0.5, 1.0 to 1.0, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.0 to 6.0, 1.0 to 6.5, 1.0 to 7.0, 1.0 to 7.5, 1.0 to 8.0, 1.0 to 8.25, 1.0 to 8.5, 1.0 to 8.75, 1.0 to 9.0, 1.0 to 9.25, 1.0 to 9.5, 1.0 to 9.75, 1.0 to 10.0, 1.5 to 0.5, 1.5 to 1.0, 1.5 to 1.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 1.5 to 6.0, 1.5 to 6.5, 1.5 to 7.0, 1.5 to 7.5, 1.5 to 8.0, 1.5 to 8.25, 1.5 to 8.5, 1.5 to 8.75, 1.5 to 9.0, 1.5 to 9.25, 1.5 to 9.5, 1.5 to 9.75, 1.5 to 10.0, 2.0 to 0.5, 2.0 to 1.0, 2.0 to 1.5, 2.0 to 2.0, 2.0 to 2.5, 2.0 to 3.0, 2.0 to 3.5, 2.0 to 4.0, 2.0 to 4.5, 2.0 to 5.0, 2.0 to 5.5, 2.0 to 6.0, 2.0 to 6.5, 2.0 to 7.0, 2.0 to 7.5, 2.0 to 8.0, 2.0 to 8.25, 2.0 to 8.5, 2.0 to 8.75, 2.0 to 9.0, 2.0 to 9.25, 2.0 to 9.5, 2.0 to 9.75, 2.0 to 10.0, 2.5 to 0.5, 2.5 to 1.0, 2.5 to 1.5, 2.5 to 2.0, 2.5 to 2.5, 2.5 to 3.0, 2.5 to 3.5, 2.5 to 4.0, 2.5 to 4.5, 2.5 to 5.0, 2.5 to 5.5, 2.5 to 6.0, 2.5 to 6.5, 2.5 to 7.0, 2.5 to 7.5, 2.5 to 8.0, 2.5 to 8.25, 2.5 to 8.5, 2.5 to 8.75, 2.5 to 9.0, 2.5 to 9.25, 2.5 to 9.5, 2.5 to 9.75, 2.5 to 10.0, 0 to 10.5, 0 to 11.0, 0 to 11.5, 0 to 12.0, 0 to 12.5, 0 to 13.0, 0 to 13.5, 0 to 14.0, 0 to 14.5, 0 to 15.0, 0.05 to 10.5, 0.05 to 11.0, 0.05 to 11.5, 0.05 to 12.0, 0.05 to 12.5, 0.05 to 13.0, 0.05 to 13.5, 0.05 to 14.0, 0.05 to 14.5, 0.05 to 15.0, 0.1 to 10.5, 0.1 to 11.0, 0.1 to 11.5, 0.1 to 12.0, 0.1 to 12.5, 0.1 to 13.0, 0.1 to 13.5, 0.1 to 14.0, 0.1 to 14.5, 0.1 to 15.0, 0.5 to 10.5, 0.5 to 11.0, 0.5 to 11.5, 0.5 to 12.0, 0.5 to 12.5, 0.5 to 13.0, 0.5 to 13.5, 0.5 to 14.0, 0.5 to 14.5, 0.5 to 15.0, 1.0 to 10.5, 1.0 to 11.0, 1.0 to 11.5, 1.0 to 12.0, 1.0 to 12.5, 1.0 to 13.0, 1.0 to 13.5, 1.0 to 14.0, 1.0 to 14.5, 1.0 to 15.0, 1.5 to 10.5, 1.5 to 11.0, 1.5 to 11.5, 1.5 to 12.0, 1.5 to 12.5, 1.5 to 13.0, 1.5 to 13.5, 1.5 to 14.0, 1.5 to 14.5, 1.5 to 15.0, 2.0 to 10.5, 2.0 to 11.0, 2.0 to 11.5, 2.0 to 12.0, 2.0 to 12.5, 2.0 to 13.0, 2.0 to 13.5, 2.0 to 14.0, 2.0 to 14.5, 2.0 to 15.0, 2.5 to 10.5, 2.5 to 11.0, 2.5 to 11.5, 2.5 to 12.0, 2.5 to 12.5, 2.5 to 13.0, 2.5 to 13.5, 2.5 to 14.0, 2.5 to 14.5, or 2.5 to 15.0. More preferably, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.1 to 5.9, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"The sweetness intensity X2": 0.05 to 0.5, 0.05 to 1.0, 0.05 to 1.5, 0.05 to 2.0, 0.05 to 2.5, 0.05 to 3.0, 0.05 to 3.5, 0.05 to 4.0, 0.05 to 4.5, 0.05 to 5.0, 0.05 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, 3.0 to 5.5, 2.0 to 6.5, 2.0 to 7.0, 2.0 to 7.5, 2.0 to 6.0, 2.0 to 6.5, 2.0 to 7.0, 2.0 to 7.5, 2.5 to 7.0, 2.5 to 7.5, 2.5 to 6.0, 2.5 to 6.5, 2.5 to 7.0, 2.5 to 7.5, 3.0 to 7.5, 3.0 to 6.0, 3.0 to 6.5, 3.0 to 7.0, 3.0 to 7.5, 3.0 to 8.0, 3.0 to 8.5, 3.0 to 9.0, 3.0 to 9.5, 3.5 to 7.0, 3.5 to 7.5, 3.5 to 8.0, 4.5 to 8.5, 3.5 to 9.0, 3.5 to 9.5, 4.0 to 7.5, 4.0 to 8.0, 4.0 to 8.5, 4.0 to 9.0, 4.0 to 9.5, 3.5 to 8.5, 3.5 to 9.0, 3.5 to 9.5, 3.5 to 10.0, 3.5 to 10.5, 3.5 to 11.0, 3.5 to 11.5, 4.0 to 11.5, 0.05 to 6.0, 0.05 to 6.5, 0.05 to 7.0, 0.05 to 7.5, 0.05 to 8.0, 0.05 to 8.5, 0.05 to 9.0, 0.05 to 9.5, 0.05 to 10.0, 0.05 to 10.5, 0.05 to 11.0, 0.05 to 11.5, 0.05 to 12.0, 0.05 to 13.0, 0.05 to 14.0, 0.05 to 15.0, 0.05 to 16.0, 0.05 to 17.0, 0.05 to 18.0, 0.5 to 6.0, 0.5 to 6.5, 0.5 to 7.0, 0.5 to 7.5, 0.5 to 8.0, 0.5 to 8.5, 0.5 to 9.0, 0.5 to 9.5, 0.5 to 10.0, 0.5 to 10.5, 0.5 to 11.0, 0.5 to 11.5, 0.5 to 12.0, 0.5 to 13.0, 0.5 to 14.0, 0.5 to 15.0, 0.5 to 16.0, 0.5 to 17.0, 0.5 to 18.0, 1.0 to 6.0, 1.0 to 6.5, 1.0 to 7.0, 1.0 to 7.5, 1.0 to 8.0, 1.0 to 8.5, 1.0 to 9.0, 1.0 to 9.5, 1.0 to 10.0, 1.0 to 10.5, 1.0 to 11.0, 1.0 to 11.5, 1.0 to 12.0, 1.0 to 13.0, 1.0 to 14.0, 1.0 to 15.0, 1.0 to 16.0, 1.0 to 17.0, 1.0 to 18.0, 1.5 to 6.0, 1.5 to 6.5, 1.5 to 7.0, 1.5 to 7.5, 1.5 to 8.0, 1.5 to 8.5, 1.5 to 9.0, 1.5 to 9.5, 1.5 to 10.0, 1.5 to 10.5, 1.5 to 11.0, 1.5 to 11.5, 1.5 to 12.0, 1.5 to 13.0, 1.5 to 14.0, 1.5 to 15.0, 1.5 to 16.0, 1.5 to 17.0, 1.5 to 18.0, 2.0 to 8.0, 2.0 to 8.5, 2.0 to 9.0, 2.0 to 9.5, 2.0 to 10.0, 2.0 to 10.5, 2.0 to 11.0, 2.0 to 11.5, 2.0 to 12.0, 2.0 to 13.0, 2.0 to 14.0, 2.0 to 15.0, 2.0 to 16.0, 2.0 to 17.0, 2.0 to 18.0, 2.5 to 8.0, 2.5 to 8.5, 2.5 to 9.0, 2.5 to 9.5, 2.5 to 10.0, 2.5 to 10.5, 2.5 to 11.0, 2.5 to 11.5, 2.5 to 12.0, 2.5 to 13.0, 2.5 to 14.0, 2.5 to 15.0, 2.5 to 16.0, 2.5 to 17.0, 2.5 to 18.0, 3.0 to 10.0, 3.0 to 10.5, 3.0 to 11.0, 3.0 to 11.5, 3.0 to 12.0, 3.0 to 13.0, 3.0 to 14.0, 3.0 to 15.0, 3.0 to 16.0, 3.0 to 17.0, 3.0 to 18.0, 3.5 to 4.0, 3.5 to 4.5, 3.5 to 5.0, 3.5 to 5.5, 3.5 to 6.0, 3.5 to 6.5, 3.5 to 12.0, 3.5 to 13.0, 3.5 to 14.0, 3.5 to 15.0, 3.5 to 16.0, 3.5 to 17.0, 3.5 to 18.0, 4.0 to 4.5, 4.0 to 5.0, 4.0 to 5.5, 4.0 to 6.0, 4.0 to 6.5, 4.0 to 7.0, 4.0 to 10.0, 4.0 to 10.5, 4.0 to 11.0, 4.0 to 12.0, 4.0 to 13.0, 4.0 to 14.0, 4.0 to 15.0, 4.0 to 16.0, 4.0 to 17.0, or 4.0 to 18.0. More preferably, 0.1 to 0.5, 0.1 to 1.0, 0.1 to 1.5, 0.1 to 2.0, 0.1 to 2.5, 0.1 to 3.0, 0.1 to 3.5, 0.1 to 4.0, 0.1 to 4.5, 0.1 to 5.0, 0.1 to 5.5, 0.5 to 1.0, 0.5 to 1.5, 0.5 to 2.0, 0.5 to 2.5, 0.5 to 3.0, 0.5 to 3.5, 0.5 to 4.0, 0.5 to 4.5, 0.5 to 5.0, 0.5 to 5.5, 1.0 to 1.5, 1.0 to 2.0, 1.0 to 2.5, 1.0 to 3.0, 1.0 to 3.5, 1.0 to 4.0, 1.0 to 4.5, 1.0 to 5.0, 1.0 to 5.5, 1.5 to 2.0, 1.5 to 2.5, 1.5 to 3.0, 1.5 to 3.5, 1.5 to 4.0, 1.5 to 4.5, 1.5 to 5.0, 1.5 to 5.5, 2.0 to 2.5, 2.0 to 3.0, 2.0 to 3.5, 2.0 to 4.0, 2.0 to 4.5, 2.0 to 5.0, 2.0 to 5.5, 2.5 to 3.0, 2.5 to 3.5, 2.5 to 4.0, 2.5 to 4.5, 2.5 to 5.0, 2.5 to 5.5, 3.0 to 3.5, 3.0 to 4.0, 3.0 to 4.5, 3.0 to 5.0, or 3.0 to 5.5.

"The amount of sodium": 5 to 90 mg/100 ml, 5 to 85 mg/100 ml, 5 to 80 mg/100 ml, 5 to 75 mg/100 ml, 5 to 70 mg/100 ml, 5 to 65 mg/100 ml, 5 to 60 mg/100 ml, 5 to 55 mg/100 ml, 5 to 50 mg/100 ml, 5 to 45 mg/100 ml, 5 to 40 mg/100 ml, 5 to 35 mg/100 ml, 5 to 30 mg/100 ml, 5 to 25 mg/100 ml, 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 90 mg/100 ml, 10 to 85 mg/100 ml, 10 to 80 mg/100 ml, 10 to 75 mg/100 ml, 10 to 70 mg/100 ml, 10 to 65 mg/100 ml, 10 to 60 mg/100 ml, 10 to 55 mg/100 ml, 10 to 50 mg/100 ml, 10 to 45 mg/100 ml, 10 to 40 mg/100 ml, 10 to 35 mg/100 ml, 10 to 30 mg/100 ml, 10 to 25 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 20 mg/100 ml, 5 to 22 mg/100 ml, 5 to 21 mg/100 ml, 10 to 22 mg/100 ml, 10 to 21 mg/100 ml, 11.5 to 22 mg/100 ml, 11.5 to 21 mg/100 ml, 11.5 to 20 mg/100 ml, 11.5 to 19 mg/100 ml, 11.5 to 18 mg/100 ml, 11.5 to 17 mg/100 ml, 11.5 to 16 mg/100 ml, 11.5 to 15 mg/100 ml, 11.5 to 14 mg/100 ml, 11.5 to 13 mg/100 ml, 11.5 to 12 mg/100 ml, 5.75 to 17.25 mg/100 ml, 5.75 to 11.5 mg/100 ml, or 11.5 to 17.25 mg/100 ml.

"The sweetness intensity X3": 4.0 to 20, 4.0 to 15, 4.0 to 12.5, 4.0 to 10, 4.5 to 20, 4.5 to 15, 4.5 to 12.5, 4.5 to 10, 5.0 to 20, 5.0 to 15, 5.0 to 12.5, 5.0 to 10, 5.5 to 20, 5.5 to 15, 5.5 to 12.5, 5.5 to 10, 6.0 to 20, 6.0 to 15, 6.0 to 12.5, 6.0 to 10, 6.5 to 20, 6.5 to 15, 6.5 to 12.5, 6.5 to 10, 7.0 to 20, 7.0 to 15, 7.0 to 12.5, 7.0 to 10, 7.5 to 20, 7.5 to 15, 7.5 to 12.5, 7.5 to 10, 7.5 to 9, 7.5 to 8, 8.0 to 20, 8.0 to 20, 8.0 to 15, 8.0 to 12.5, 8.0 to 10, 8.5 to 20, 8.5 to 15, 8.5 to 12.5, 8.5 to 10, 9.0 to 20, 9.0 to 15, 9.0 to 12.5, 9.0 to 10, 9.5 to 20, 9.5 to 15, 9.5 to 12.5, 9.5 to 10, 10.0 to 20, 10.0 to 15, 10.0 to 12.5, 10.5 to 20, 10.5 to 15, 10.5 to 12.5, 4.0 to 18, 4.0 to 16, 4.0 to 15.5, 4.0 to 14, 4.5 to 18, 4.5 to 16, 4.5 to 15.5, 4.5 to 14, 5.0 to 18, 5.0 to 16, 5.0 to 15.5, 5.0 to 14, 5.5 to 18, 5.5 to 16, 5.5 to 15.5, 5.5 to 14, 6.0 to 18, 6.0 to 16, 6.0 to 15.5, 6.0 to 14, 6.5 to 18, 6.5 to 16, 6.5 to 15.5, 6.5 to 14, 7.0 to 18, 7.0 to 16, 7.0 to 15.5, 7.0 to 14, 7.5 to 18, 7.5 to 16, 7.5 to 15.5, 7.5 to 14, 7.5 to 9, 7.5 to 8, 8.0 to 18, 8.0 to 18, 8.0 to 16, 8.0 to 15.5, 8.0 to 14, 8.5 to 18, 8.5 to 16, 8.5 to 15.5, 8.5 to 14, 9.0 to 18, 9.0 to 16, 9.0 to 15.5, 9.0 to 14, 9.5 to 18, 9.5 to 16, 9.5 to 15.5, 9.5 to 14, 10.0 to 18, 10.0 to 16, 10.0 to 15.5, 10.5 to 18, 10.5 to 16, or 10.5 to 15.5.

"The amount of mogroside V P2 (ppm)": 20 to 550, 25 to 550, 30 to 550, 35 to 550, 40 to 550, 45 to 550, 50 to 550, 55 to 550, 20 to 540, 25 to 540, 30 to 540, 35 to 540, 40 to 540, 45 to 540, 50 to 540, 55 to 540, 20 to 530, 25 to 530, 30 to 530, 35 to 530, 40 to 530, 45 to 530, 50 to 530, 55 to 530, 20 to 520, 25 to 520, 30 to 520, 35 to 520, 40 to 520, 45 to 520, 50 to 520, 55 to 520, 20 to 510, 25 to 510, 30 to 510, 35 to 510, 40 to 510, 45 to 510, 50 to 510, 55 to 510, 20 to 505, 25 to 505, 30 to 505, 35 to 505, 40 to 505, 45 to 505, 50 to 505, 55 to 505, 20 to 500, 25 to 500, 30 to 500, 35 to 500, 40 to 500, 45 to 500, 50 to 500, 55 to 500, 20 to 495, 25 to 495, 30 to 495, 35 to 495, 40 to 495, 45 to 495, 50 to 495, 55 to 495, 20 to 490, 25 to 490, 30 to 490, 35 to 490, 40 to 490, 45 to 490, 50 to 490, 55 to 490, 1 to 700, 5 to 700, 10 to 700, 15 to 700, 20 to 700, 25 to 700, 30 to 700, 35 to 700, 40 to 700, 45 to 700, 50 to 700, 55 to 700, 1 to 600, 5 to 600, 10 to 600, 15 to 600, 20 to 600, 25 to 600, 30 to 600, 35 to 600, 40 to 600, 45 to 600, 50 to 600, 55 to 600, 1 to 550, 1 to 540, 1 to 530, 1 to 520, 1 to 510, 1 to 505, 1 to 500, 1 to 495, 1 to 490, 5 to 550, 5 to 540, 5 to 530, 5 to 520, 5 to 510, 5 to 505, 5 to 500, 5 to 495, 5 to 490, 10 to 550, 10 to 540, 10 to 530, 10 to 520, 10 to 510, 10 to 505, 10 to 500, 10 to 495, 10 to 490, 15 to 550, 15 to 550, 15 to 530, 15 to 520, 15 to 510, 15 to 505, 15 to 500, 15 to 495, or 15 to 490.

The energy: 0 to 50 Kcal/100 ml, 0 to 45 Kcal/100 ml, 0 to 40 Kcal/100 ml, 0 to 35 Kcal/100 ml, 0 to 30 Kcal/100 ml, 0 to 25 Kcal/100 ml, 0 to 20 Kcal/100 ml, 0 to 15 Kcal/100 ml, 0 to 10 Kcal/100 ml, 0 to 5 Kcal/100 ml, 5 to 50 Kcal/100 ml, 5 to 45 Kcal/100 ml, 5 to 40 Kcal/100 ml, 5 to 35 Kcal/100 ml, 5 to 30 Kcal/100 ml, 5 to 25 Kcal/100 ml, 5 to 20 Kcal/100 ml, 5 to 15 Kcal/100 ml, 5 to 10 Kcal/100 ml, 10 to 50 Kcal/100 ml, 10 to 45 Kcal/100 ml, 10 to 40 Kcal/100 ml, 10 to 35 Kcal/100 ml, 10 to 30 Kcal/100 ml, 10 to 25 Kcal/100 ml, 10 to 20 Kcal/100 ml, 10 to 15 Kcal/100 ml, 15 to 50 Kcal/100 ml, 15 to 45 Kcal/100 ml, 15 to 40 Kcal/100 ml, 15 to 35 Kcal/100 ml, 15 to 30 Kcal/100 ml, 15 to 25 Kcal/100 ml, 15 to 20 Kcal/100 ml, 20 to 50 Kcal/100 ml, 20 to 45 Kcal/100 ml, 20 to 40 Kcal/100 ml, 20 to 35 Kcal/100 ml, 20 to 30 Kcal/100 ml, 20 to 25 Kcal/100 ml, 25 to 50 Kcal/100 ml, 25 to 45 Kcal/100 ml, 25 to 40 Kcal/100 ml, 25 to 35 Kcal/100 ml, 25 to 30 Kcal/100 ml, 0 to 32 Kcal/100 ml, 0 to 24 Kcal/100 ml, 0 to 8 Kcal/100 ml, 0 to 4 Kcal/100 ml, 4 to 32 Kcal/100 ml, 4 to 24 Kcal/100 ml, 4 to 8 Kcal/100 ml, 8 to 32 Kcal/100 ml, 8 to 24 Kcal/100 ml, or 24 to 32 Kcal/100 ml.

In addition, in the coffee beverage C of the present invention, the forms of the natural sugar (including examples of the combination of glucose, sucrose, fructose, maltose, oligosaccharide, high-fructose corn syrup, or lactose) and sodium are defined as described in the section for the coffee beverage of the present invention.

Further, another aspect of the present invention provides a coffee beverage comprising:

(a) a natural sugar in an amount of 0.1 to 0.5 w/v %, 0.1 to 1.0 w/v %, 0.1 to 1.5 w/v %, 0.1 to 2.0 w/v %, 0.1 to 2.5 w/v %, 0.1 to 3.0 w/v %, 0.1 to 3.5 w/v %, 0.1 to 4.0 w/v %, 0.1 to 4.5 w/v %, 0.1 to 5.0 w/v %, 0.1 to 5.5 w/v %, 0.1 to 5.9 w/v %, 0.5 to 1.0 w/v %, 0.5 to 1.5 w/v %, 0.5 to 2.0 w/v %, 0.5 to 2.5 w/v %, 0.5 to 3.0 w/v %, 0.5 to 3.5 w/v %, 0.5 to 4.0 w/v %, 0.5 to 4.5 w/v %, 0.5 to 5.0 w/v %, 0.5 to 5.5 w/v %, 0.5 to 5.9 w/v %, 1.0 to 1.5 w/v %, 1.0 to 2.0 w/v %, 1.0 to 2.5 w/v %, 1.0 to 3.0 w/v %, 1.0 to 3.5 w/v %, 1.0 to 4.0 w/v %, 1.0 to 4.5 w/v %, 1.0 to 5.0 w/v %, 1.0 to 5.5 w/v %, 1.0 to 5.9 w/v %, 1.5 to 2.0 w/v %, 1.5 to 2.5 w/v %, 1.5 to 3.0 w/v %, 1.5 to 3.5 w/v %, 1.5 to 4.0 w/v %, 1.5 to 4.5 w/v %, 1.5 to 5.0 w/v %, 1.5 to 5.5 w/v %, 1.5 to 5.9 w/v %, 2.0 to 2.5 w/v %, 2.0 to 3.0 w/v %, 2.0 to 3.5 w/v %, 2.0 to 4.0 w/v %, 2.0 to 4.5 w/v %, 2.0 to 5.0 w/v %, 2.0 to 5.5 w/v %, or 2.0 to 5.9 w/v %;

(b) at least one high-intensity sweetener selected from the group consisting of rebaudioside M, rebaudioside D, a Luo han guo extract, mogroside V, and a combination thereof in an amount of 20 to 550 ppm, 25 to 550 ppm, 30 to 550 ppm, 35 to 550 ppm, 40 to 550 ppm, 45 to 550 ppm, 50 to 550 ppm, 55 to 550 ppm, 20 to 540 ppm, 25 to 540 ppm, 30 to 540 ppm, 35 to 540 ppm, 40 to 540 ppm, 45 to 540 ppm, 50 to 540 ppm, 55 to 540 ppm, 20 to 530 ppm, 25 to 530 ppm, 30 to 530 ppm, 35 to 530 ppm, 40 to 530 ppm, 45 to 530 ppm, 50 to 530 ppm, 55 to 530 ppm, 20 to 520 ppm, 25 to 520 ppm, 30 to 520 ppm, 35 to 520 ppm, 40 to 520 ppm, 45 to 520 ppm, 50 to 520 ppm, 55 to 520 ppm, 20 to 510 ppm, 25 to 510 ppm, 30 to 510 ppm, 35 to 510 ppm, 40 to 510 ppm, 45 to 510 ppm, 50 to 510 ppm, 55 to 510 ppm, 20 to 505 ppm, 25 to 505 ppm, 30 to 505 ppm, 35 to 505 ppm, 40 to 505 ppm, 45 to 505 ppm, 50 to 505 ppm, 55 to 505 ppm, 20 to 500 ppm, 25 to 500 ppm, 30 to 500 ppm, 35 to 500 ppm, 40 to 500 ppm, 45 to 500 ppm, 50 to 500 ppm, 55 to 500 ppm, 20 to 495 ppm, 25 to 495 ppm, 30 to 495 ppm, 35 to 495 ppm, 40 to 495 ppm, 45 to 495 ppm, 50 to 495 ppm, 55 to 495 ppm, 20 to 490 ppm, 25 to 490 ppm, 30 to 490 ppm, 35 to 490 ppm, 40 to 490 ppm, 45 to 490 ppm, 50 to 490 ppm, or 55 to 490 ppm; and (c) 5 to 90 mg/100 ml, 5 to 85 mg/100 ml, 5 to 80 mg/100 ml, 5 to 75 mg/100 ml, 5 to 70 mg/100 ml, 5 to 65 mg/100 ml, 5 to 60 mg/100 ml, 5 to 55 mg/100 ml, 5 to 50 mg/100 ml, 5 to 45 mg/100 ml, 5 to 40 mg/100 ml, 5 to 35 mg/100 ml, 5 to 30 mg/100 ml, 5 to 25 mg/100 ml, 5 to 20 mg/100 ml, 5 to 19 mg/100 ml, 5 to 18 mg/100 ml, 5 to 17 mg/100 ml, 5 to 16 mg/100 ml, 5 to 15 mg/100 ml, 5 to 14 mg/100 ml, 5 to 13 mg/100 ml, 5 to 12 mg/100 ml, 5 to 11 mg/100 ml, 5 to 10 mg/100 ml, 10 to 90 mg/100 ml, 10 to 85 mg/100 ml, 10 to 80 mg/100 ml, 10 to 75 mg/100 ml, 10 to 70 mg/100 ml, 10 to 65 mg/100 ml, 10 to 60 mg/100 ml, 10 to 55 mg/100 ml, 10 to 50 mg/100 ml, 10 to 45 mg/100 ml, 10 to 40 mg/100 ml, 10 to 35 mg/100 ml, 10 to 30 mg/100 ml, 10 to 25 mg/100 ml, 10 to 20 mg/100 ml, 10 to 19 mg/100 ml, 10 to 18 mg/100 ml, 10 to 17 mg/100 ml, 10 to 16 mg/100 ml, 10 to 15 mg/100 ml, 15 to 90 mg/100 ml, 15 to 85 mg/100 ml, 15 to 80 mg/100 ml, 15 to 75 mg/100 ml, 15 to 70 mg/100 ml, 15 to 65 mg/100 ml, 15 to 60 mg/100 ml, 15 to 55 mg/100 ml, 15 to 50 mg/100 ml, 15 to 45 mg/100 ml, 15 to 40 mg/100 ml, 15 to 35 mg/100 ml, 15 to 30 mg/100 ml, 15 to 25 mg/100 ml, 15 to 20 mg/100 ml, 20 to 90 mg/100 ml, 20 to 85 mg/100 ml, 20 to 80 mg/100 ml, 20 to 75 mg/100 ml, 20 to 70 mg/100 ml, 20 to 65 mg/100 ml, 20 to 60 mg/100 ml, 20 to 55 mg/100 ml, 20 to 50 mg/100 ml, 20 to 45 mg/100 ml, 20 to 40 mg/100 ml, 20 to 35 mg/100 ml, 20 to 30 mg/100 ml, 20 to 25 mg/100 ml, 25 to 90 mg/100 ml, 25 to 85 mg/100 ml, 25 to 80 mg/100 ml, 25 to 75 mg/100 ml, 25 to 70 mg/100 ml, 25 to 65 mg/100 ml, 25 to 60 mg/100 ml, 25 to 55 mg/100 ml, 25 to 50 mg/100 ml, 25 to 45 mg/100 ml, 25 to 40 mg/100 ml, 25 to 35 mg/100 ml, 25 to 30 mg/100 ml, 30 to 90 mg/100 ml, 30 to 85 mg/100 ml, 30 to 80 mg/100 ml, 30 to 75 mg/100 ml, 30 to 70 mg/100 ml, 30 to 65 mg/100 ml, 30 to 60 mg/100 ml, 30 to 55 mg/100 ml, 30 to 50 mg/100 ml, 30 to 45 mg/100 ml, 30 to 40 mg/100 ml, 30 to 35 mg/100 ml, 35 to 90 mg/100 ml, 35 to 85 mg/100 ml, 35 to 80 mg/100 ml, 35 to 75 mg/100 ml, 35 to 70 mg/100 ml, 35 to 65 mg/100 ml, 35 to 60 mg/100 ml, 35 to 55 mg/100 ml, 35 to 50 mg/100 ml, 35 to 45 mg/100 ml, 35 to 40 mg/100 ml, 40 to 90 mg/100 ml, 40 to 85 mg/100 ml, 40 to 80 mg/100 ml, 40 to 75 mg/100 ml, 40 to 70 mg/100 ml, 40 to 65 mg/100 ml, 40 to 60 mg/100 ml, 40 to 55 mg/100 ml, 40 to 50 mg/100 ml, or 40 to 45 mg/100 ml of sodium.

2. Method for Producing Coffee Beverage

Even in a coffee beverage with a reduced energy (Kcal/100 ml) level by setting the amounts of the natural sugar and the high-intensity sweetener to low, it is possible to enhance the sweetness based on the natural sugar and the high-intensity sweetener by adding sodium in a concentration so low as to not be detectable by the human.

Accordingly, the present invention provides, as a further another aspect, the following method for producing a coffee beverage with enhanced sweetness (hereinafter, referred to as "the method of the present invention").

A method for producing a coffee beverage, comprising: to a raw material, (i) adding (a) a natural sugar in an amount corresponding to a sweetness intensity X1 and (b) a high-intensity sweetener in an amount corresponding to a sweetness intensity X2; and (ii) adding (c) sodium such that a sodium concentration in the beverage is 5 mg/100 ml to 90 mg/100 ml, to a raw material, wherein the high-intensity sweetener comprises at least one high-intensity sweetener b1 selected from the group consisting of rebaudioside M, rebaudioside D, rebaudioside N, rebaudioside O, rebaudioside E, a Luo han guo extract, mogroside V, and thaumatin; and sweetness of a sweetness intensity X3 is exhibited by the components (a) to (c), and $0.1<(X1+X2)\leq 20$ is satisfied.

The coffee beverage produced by the method of the present invention is the coffee beverage of the present invention described in the above section "1. Coffee beverage having improved taste quality exhibited by natural sugar and high-intensity sweetener". In addition, the "raw material" in the method of the present invention may be each material or a mixture thereof necessary for production of a coffee beverage and may further include an additional component such as a preservative, a flavoring agent, a carrier, or a milk component. In addition, the "raw material" may be composed of a plurality of materials. However, regardless of the type of the raw material, the finally produced coffee beverage of the present invention does not include a substance that exhibits sweetness, other than the components (a) and (b), as a sweetener.

In the method of the present invention, any of the following steps (i) and (ii) may be performed first:

(i) a step of adding (a) a natural sugar in an amount corresponding to a sweetness intensity X1 and (b) a high-intensity sweetener in an amount corresponding to a sweetness intensity X2; and (ii) a step of adding (c) sodium in such a way that the sodium concentration in the beverage is 5 to 90 mg/100 ml.

In step (i), (a) a natural sugar in an amount corresponding to a sweetness intensity X1 and (b) a high-intensity sweetener in an amount corresponding to a sweetness intensity X2 are added to a raw material, where (a) a natural sugar in an amount corresponding to a sweetness intensity X1 and (b) a high-intensity sweetener in an amount corresponding to a sweetness intensity X2 may be separately added.

Furthermore, when (a) a natural sugar in an amount corresponding to a sweetness intensity X1 is added, the natural sugar in an amount corresponding to the sweetness intensity X1 need not be added at once and may be added in several batches. Similarly, when (b) a high-intensity sweetener in an amount corresponding to a sweetness intensity X2 is added, the natural sugar in an amount corresponding to the sweetness intensity X2 need not be added at once and may be added in several batches.

In addition, as another aspect, it is also possible to adjust the amounts of a natural sugar and a high-intensity sweetener contained in the finally produced coffee beverage to the amounts corresponding to a sweetness intensity X1 and a sweetness intensity X2, respectively, by adding a mixture of the natural sugar and the high-intensity sweetener in several batches.

In step (ii), also when (c) sodium is added in such a way that the sodium concentration in the beverage is 5 mg/100 ml to 90 mg/100 ml, sodium need not be added at once and may be added in several batches.

Sodium that is added to a raw material in step (ii) may be, for example, at least one form selected from the group consisting of sodium chloride, sodium hydroxide, sodium malate, sodium sulfate, sodium citrate, sodium phosphate, sodium carbonate, sodium disulfide, sodium bicarbonate, sodium alginate, sodium argininate, sodium glucoheptanoate, sodium gluconate, sodium glutamate, sodium tartrate, sodium aspartate, sodium lactate, sodium caseinate, sodium ascorbate, and a mixture thereof. In addition, since sodium is also contained in an extract of coffee beans, the amount of sodium is adjusted such that the total content of this sodium derived from coffee and the additional sodium is 5 mg/100 ml to 90 mg/100 ml. In addition, when the pH of an extract liquid is adjusted using a pH adjuster in extraction of coffee, the amount of sodium contained in the pH adjuster is also included in the total content of sodium in the coffee beverage.

The "addition" herein means not only the actual operation of adding either of the components (a), (b), and (c) to a raw material but also the operation of adjusting the amounts of the components (a), (b), and (c) in the finally produced coffee beverage to an amount corresponding to a sweetness intensity X1, an amount corresponding to a sweetness intensity X2, and 5 mg/100 ml to 90 mg/100 ml, respectively, through the production process of a coffee beverage of the present invention.

For example, in a case in which a first raw material contains a milk component, a grain, a bean, or an extract thereof and thereby contains one or more of the components (a), (b), and (c) in the raw material in advance, a second raw material to be mixed with the first raw material also contains the components (a), (b), and (c), and a coffee beverage of the present invention can be produced by mixing the first and second raw materials, the operation of independently adding the components (a), (b), and (c) to the raw materials is not carried out. However, in the method of the present invention, steps (i) and (ii) are considered to have been carried out as long as the finally produced coffee beverage of the present invention contains (a) a natural sugar in an amount corresponding to a sweetness intensity X1, (b) a high-intensity sweetener in an amount corresponding to a sweetness intensity X2, and (c) 5 mg/100 ml to 90 mg/100 ml of sodium.

When the coffee beverage of the present invention is a packaged beverage, the method for producing a beverage of the present invention includes a step of filling a container with the coffee beverage. In addition, when provided as a packaged beverage, sterilization of the coffee beverage before or after filling a container with the coffee beverage allows long-term storage and is therefore preferable. For example, when provided as a canned coffee beverage, a can is filled with a predetermined amount of the coffee beverage, and for example, heat sterilization can be performed by carrying out retort sterilization at 120° C. to 125° C. for about 5 to 20 minutes. In addition, when provided as a beverage packed in a PET bottle, paper pack, or bottle, a packaged beverage can be obtained by performing, for example, UHT sterilization by keeping 130° C. to 145° C. for about 2 to 120 seconds and hot pack filling or low-temperature aseptic filling of a predetermined amount of the beverage.

In the method of the present invention, the "coffee beverage", the "natural sugar", the "sweetness intensity X1", the "high-intensity sweetener", the "sweetness intensity X2", the sodium content, the form of sodium in the coffee beverage, the "sweetness intensity X3", and the energy are defined as described in the above section for the coffee beverage, and the numerical values described in the above section for the coffee beverage are applicable as they are. In addition, examples of the "combination of glucose, sucrose, fructose, maltose, oligosaccharide, high-fructose corn syrup, or lactose" and the "combination of high-intensity sweetener" are the same as those described in the above section for the coffee beverage.

In a certain embodiment, the coffee beverage produced by the method of the present invention is a coffee beverage comprising:
(a) a natural sugar in an amount corresponding to a sweetness intensity X1 of 0.1 to 5;
(b) a high-intensity sweetener in an amount corresponding to a sweetness intensity X2 of 0.1 to 5; and
(c) 5 to 90 mg/100 ml of sodium,
wherein sweetness of a sweetness intensity X3 of 5.5 to 12.5 is exhibited by the components (a) to (c), and $0.1<(X1+X2)\leq12.5$ is satisfied.

In another embodiment, the coffee beverage produced by the method of the present invention is a coffee beverage comprising:
(a) a natural sugar in an amount corresponding to a sweetness intensity X1 of 3 to 5;
(b) a high-intensity sweetener in an amount corresponding to a sweetness intensity X2 of 1 to 5; and
(c) 25 to 40 mg/100 ml of sodium,
wherein sweetness of a sweetness intensity of 5.5 to 12.5 is exhibited by the components (a) to (c), and $0.1<(X1+X2)\leq12.5$ is satisfied. Furthermore, in the coffee beverage of the present invention, preferably, the energy is 50 Kcal/100 ml or less, and (X1+X2) is 6 or more.

In further another embodiment, the coffee beverage produced by the method of the present invention is a coffee beverage comprising:
(a) a natural sugar in an amount corresponding to a sweetness intensity X1 of 0.1 to 5;
(b) a high-intensity sweetener in an amount corresponding to a sweetness intensity X2 of 0.1 to 3; and
(c) 5 mg/100 ml to 90 mg/100 ml of sodium,
wherein sweetness of a sweetness intensity of 2.0 to 12.0 is exhibited by the components (a) to (c), and $0.1<(X1+X2)\leq12.5$ is satisfied.

In another embodiment, the coffee beverage produced by the method of the present invention is a coffee beverage comprising:
(a) a natural sugar in an amount corresponding to a sweetness intensity X1 of 3 to 5;
(b) a high-intensity sweetener in an amount corresponding to a sweetness intensity X2 of 1 to 3; and
(c) 5 mg/100 ml to 90 mg/100 ml of sodium,
wherein sweetness of a sweetness intensity of 2.0 to 12.0 is exhibited by the components (a) to (c), and $0.1<(X1+X2)\leq12.5$ is satisfied.

In a specific aspect, the present invention provides the following method (hereinafter, referred to as "the method A of the present invention").

A method for producing a coffee beverage, the method comprising the steps of:
(i) adding (a) a natural sugar in an amount of a sweetness intensity X1 and (b) a high-intensity sweetener selected from the group consisting of rebaudioside M, rebaudioside D, and a combination thereof in an amount of a sweetness intensity X2; and
(ii) adding (c) sodium in such a way that the sodium content in the beverage is 5 to 90 mg/100 ml,
to a raw material,
wherein sweetness of a sweetness intensity X3 is exhibited by the components (a) to (c), and $0.1<(X1+X2)\leq20$ is satisfied.

In the method A of the present invention, the "coffee beverage", the "natural sugar" (including examples of the combination of glucose, sucrose, fructose, maltose, oligosaccharide, high-fructose corn syrup, or lactose), the "sweetness intensity X1", the "high-intensity sweetener", the "sweetness intensity X2", the sodium content, the form of sodium in the coffee beverage, the "sweetness intensity X3", and the energy are defined as described in the above section for the coffee beverage A, and the numerical values described in the above section for the coffee beverage A are applicable as they are. In addition, the coffee beverage in the method A of the present invention corresponds to the coffee beverage A of the present invention, and the above items for the coffee beverage A of the present invention are applicable as they are. Furthermore, the "raw material", the "addition", the order of steps (i) and (ii), and the addition mode of each component in the method A of the present invention are defined as described for the method of the present invention.

In another specific aspect, the present invention provides the following method (hereinafter, referred to as "the method B of the present invention").

A method for producing a coffee beverage, the method comprising the steps of:
(i) adding (a) a natural sugar in an amount of a sweetness intensity X1 and (b) a Luo han guo extract in an amount of a sweetness intensity X2; and
(ii) adding (c) sodium in such a way that the sodium content in the beverage is 5 to 90 mg/100 ml,
to a raw material,
wherein sweetness of a sweetness intensity X3 is exhibited by the components (a) to (c), and $0.1<(X1+X2)\leq20$ is satisfied.

In the method B of the present invention, the "coffee beverage", the "natural sugar" (including examples of the combination of glucose, sucrose, fructose, maltose, oligosaccharide, high-fructose corn syrup, or lactose), the "sweetness intensity X1", the "Luo han guo extract", the "sweetness intensity X2", the sodium content, the form of sodium in the coffee beverage, the "sweetness intensity X3", and the energy are defined as described in the above section for the coffee beverage B, and the numerical values described in the above section for the coffee beverage B are applicable as they are. In addition, the coffee beverage in the method B of the present invention corresponds to the coffee beverage B of the present invention, and the above items for the coffee beverage B of the present invention are applicable as they are. Furthermore, the "raw material", the "addition", the order of steps (i) and (ii), and the addition mode of each component in the method B of the present invention are defined as described for the method of the present invention.

In another specific aspect, the present invention provides the following method (hereinafter, referred to as "the method C of the present invention").

The method C of the present invention is a method for producing a coffee beverage, the method comprising the steps of:
(i) adding (a) a natural sugar in an amount of a sweetness intensity X1 and (b) mogroside V in an amount of a sweetness intensity X2; and
(ii) adding (c) sodium in such a way that the sodium content in the beverage is 5 to 90 mg/100 ml,
to a raw material,
wherein sweetness of a sweetness intensity X3 is exhibited by the components (a) to (c), and $0.1<(X1+X2)\leq20$ is satisfied.

In the method C of the present invention, the "coffee beverage", the "natural sugar" (including examples of the combination of glucose, sucrose, fructose, maltose, oligosaccharide, high-fructose corn syrup, or lactose), the "sweetness intensity X1", the "mogroside V", the "sweetness intensity X2", the sodium content, the form of sodium in the coffee beverage, the "sweetness intensity X3", and the energy are defined as described in the above section for the coffee beverage C, and the numerical values described in the above section for the coffee beverage C are applicable as they are. In addition, the coffee beverage in the method C of the present invention corresponds to the coffee beverage C of the present invention, and the above items for the coffee beverage C of the present invention are applicable as they are. Furthermore, the "raw material", the "addition", the order of steps (i) and (ii), and the addition mode of each component in the method C of the present invention are defined as described for the method of the present invention.

In the coffee beverage produced by a method of the present invention,
the sweetness intensity X1 of the natural sugar, the sweetness intensity X2 of the high-intensity sweetener, the sodium content, and the sweetness intensity X3 exhibited by the coffee beverage may be any values as long as $0.1<(X1+X2)\leq 20$ is satisfied. For example, it is also possible to combine any of the numerical values of the sweetness intensity X1, the sweetness intensity X2, the sodium content, the sweetness intensity X3, and the energy shown in the section for the coffee beverage of the present invention.

3. Concentrate for Providing Coffee Beverage

The present invention provides, as another embodiment, a concentrate for providing the coffee beverage of the above present invention (hereinafter, referred to as "the concentrate of the present invention"). In an aspect of the present invention, the concentrate of the present invention comprises:
(a) a natural sugar in an amount corresponding to a sweetness intensity X4;
(b) a high-intensity sweetener in an amount corresponding to a sweetness intensity X5; and
(c) 50 mg/100 ml to 900 mg/100 ml of sodium,
wherein $(X4+X5)\leq 200$, preferably $1<(X4+X5)\leq 200$, and more preferably $50<(X4+X5)\leq 200$ are satisfied.

The concentrate of the present invention is used for providing a coffee beverage by diluting in an arbitrary ratio. The "coffee beverage" is the same as that described in "1. Coffee beverage having improved taste quality exhibited by natural sugar and high-intensity sweetener". For example, the concentrate of the present invention can be used in a beverage as a syrup or an undiluted solution. In this instance, the concentrate can be diluted 2-fold, 3-fold, 4-fold, 5-fold, 6-fold, 7-fold, 8-fold, 9-fold, or 10-fold and used. In addition, the concentrate of the present invention is concentrated and is therefore preferable in the aspects of preservability and transportability. The concentrate of the present invention may be solid or liquid.

The concentrate of the present invention is a 2 to 10-fold concentrate, preferably 3 to 9-fold concentrate, more preferably 4 to 8-fold concentrate, and further preferably 5 to 7-fold concentrate of the coffee beverage of the present invention.

The concentrate in an aspect of the present invention is a 6-fold concentrate of the coffee beverage of the present invention and comprises:
(a) a natural sugar in an amount corresponding to a sweetness intensity X6;
(b) a high-intensity sweetener in an amount corresponding to a sweetness intensity X7; and
(c) 30 mg/100 ml to 540 mg/100 ml of sodium,
wherein $(X6+X7)\leq 120$, preferably $0.6<(X6+X7)\leq 120$, and more preferably $30<(X6+X7)\leq 120$ are satisfied.

The concentrate in another aspect of the present invention is a 8-fold concentrate of the coffee beverage of the present invention and comprises:
(a) a natural sugar in an amount corresponding to a sweetness intensity X8;
(b) a high-intensity sweetener in an amount corresponding to a sweetness intensity X9; and
(c) 40 mg/100 ml to 720 mg/100 ml of sodium,
wherein $(X8+X9)\leq 160$, preferably $0.8<(X8+X9)\leq 160$, and more preferably $40<(X8+X9)\leq 160$ are satisfied.

4. Method for Enhancing Sweetness of Coffee Beverage

The present invention provides, as another embodiment, a method for enhancing a sweetness of a coffee beverage (hereinafter, referred to as "the sweetness enhancing method of the present invention"). In an aspect of the present invention, the sweetness enhancing method of the present invention is characterized by containing
(a) a natural sugar in an amount corresponding to a sweetness intensity X1,
(b) a high-intensity sweetener in an amount corresponding to a sweetness intensity X2, and
(c) 5 mg/100 ml to 90 mg/100 ml of sodium in a coffee beverage.

According to the sweetness enhancing method of the present invention, the sweetness of the coffee beverage is enhanced, and it is possible to provide a coffee beverage having sweetness higher than the mere sum of the sweetness intensity when the component (a) is added to the coffee beverage and the sweetness intensity when the component (b) is added to the coffee beverage. In the sweetness enhancing method of the present invention, the "coffee beverage", the "natural sugar", the "sweetness intensity X1", the "high-intensity sweetener", the "sweetness intensity X2", the sodium content, the form of sodium in the coffee beverage, the "sweetness intensity X3", and the energy are defined as described in the above section for the coffee beverage, and the numerical values described in the above section for the coffee beverage are applicable as they are. In addition, examples of the "combination of glucose, sucrose, fructose, maltose, oligosaccharide, high-fructose corn syrup, or lactose" and the "combination of high-intensity sweetener" are the same as those described in the above section for the coffee beverage.

In the present specification, the term "at least" means that the number of a specific item may be greater than or equal to the mentioned number. In addition, in the present application, the term "about" means that a subject matter is in a range of ±25%, ±10%, ±5%, ±3%, ±2%, or ±1% of the numerical value following the "about". For example, "about 10" means a range of 7.5 to 12.5.

EXAMPLE

Hereinafter, the present invention will be specifically described with reference to examples but is not limited to the following examples.

Incidentally, in examples shown below, the sodium content contained in a beverage as a base before the addition of various additives was measured by atomic absorption spectrometry using SpectrAA240FS (manufactured by Agilent Technologies, Inc.). In addition, the sodium content in a beverage sample after the addition of various additives is that obtained by adding the sodium content contained in the various additives calculated from the amounts of the additives to the sodium content in the beverage as the base measured by the above method.

[Example 1] Evaluation of Taste Quality Improvement Effect by Sodium

Experiment Method

Natural sugars {sucrose (manufactured by Pacific Sugar Mfg. Co., Ltd.) and glucose (manufactured by Showa Sangyo Co., Ltd.)}, rebaudioside D (RebD) (purity: 95% or more), and sodium gluconate were dissolved in a coffee extract liquid (a mixture of a coffee extract and a pH adjuster, caffeine content: 40 mg/100 ml, sodium content: 19 mg/100 ml) in the ratios shown in Table 2 below to prepare beverage samples. In addition, the solution not containing sodium gluconate was used as sample 1.

Incidentally, the Brix in Table 2 was calculated from the concentrations of the natural sugars, the sodium content in a beverage was calculated from the amount of sodium gluconate added and the sodium content derived from the coffee extract liquid, and the energy (kcal/100 ml) was calculated by taking those derived from RebD and sodium as 0 (kcal/100 ml).

TABLE 2

| Content | Sample 1 | 1-1 | 1-2 | 1-3 | 1-4 |
|---|---|---|---|---|---|
| Sucrose (w/v %) | 1.0 | 1.0 | 1.0 | 1.0 | 1.0 |
| Glucose (w/v %) | 3.5 | 3.5 | 3.5 | 3.5 | 3.5 |
| Brix (derived from sucrose + glucose) | 4.5 | 4.5 | 4.5 | 4.5 | 4.5 |
| RebD (ppm) | 208 | 208 | 208 | 208 | 208 |
| Sodium gluconate (g/L) | 0 | 0.95 | 1.90 | 2.85 | 3.80 |
| Sodium content in beverage sample (mg/100 ml) | 19 | 29 | 39 | 49 | 59 |
| Energy (Kcal/100 ml) | 18 | 18 | 18 | 18 | 18 |

The taste quality improvement effect by sodium was verified by sensory comparison of taste qualities of these beverage samples. The taste qualities as sensory evaluation items were "intensity of sweetness", "intensity of flavor (aroma)", "intensity of odd taste (such as bitter taste and astringent taste)", and "intensity of saltiness", and the verification was carried out by those (four persons) who received sensory training as panelists.

First, each panelist calculated the "sensory evaluation score" for each taste quality of each beverage sample based on the common taste quality evaluation criteria possessed by the panelists through daily training.

The "sensory evaluation score" a difference in the taste quality from sample 1 quantified in a range of −3.0 to +3.0 based on the degree of taste quality of sample 1 defined as "0" (reference). The criteria of the "sensory evaluation score" of each item are as follows.
(Sensory Evaluation Score)
  "+3.0": it is felt that the taste quality as an object is very strong compared with sample 1;
  "+2.0": it is felt that the taste quality as an object is strong compared with sample 1;
  "+1.0": it is felt that the taste quality as an object is slightly strong compared with sample 1;
  "0": it is felt that the taste quality as an object is equal to sample 1;
  "−1.0": it is felt that the taste quality as an object is slightly weak compared with sample 1;
  "−2.0": it is felt that the taste quality as an object is weak compared with sample 1; and
  "−3.0": it is felt that the taste quality as an object is very weak compared with sample 1.

Incidentally, in light of the above criteria, for example, when it was judged that the taste quality was between "+1.0" and "+2.0", it was scored as "+1.5" in 0.5 increments.

The "sensory evaluation score" calculated by each panelist was converted to a "converted score" based on the following criteria, and the total value of the converted scores of four panelists was calculated for each taste quality.
(Converted Score)
  Converted score "3": a sensory evaluation score of +1.5 or more;
  Converted score "2": a sensory evaluation score of +1.0 or more and less than +1.5;
  Converted score "1": a sensory evaluation score of +0.5 or more and less than +1.0;
  Converted score "0": a sensory evaluation score of higher than −0.5 and less than +0.5;
  Converted score "−1": a sensory evaluation score of higher than −1.0 and −0.5 or less;
  Converted score "−2": a sensory evaluation score of higher than −1.5 and −1.0 or less; and
  Converted score "−3": a sensory evaluation score of −1.5 or less.

Incidentally, regarding the "intensity of sweetness" and the "intensity of flavor", a larger total value of converted scores is preferable, and regarding the "intensity of odd taste" and the "intensity of saltiness", a smaller total value of converted scores is preferable.

Results

The results of the calculated total value of converted scores of each taste quality are shown in Table 3.

TABLE 3

| Taste quality | Sample 1 | 1-1 | 1-2 | 1-3 | 1-4 |
|---|---|---|---|---|---|
| Intensity of sweetness | 0 | 4 | 5 | 6 | 5 |
| Intensity of flavor | 0 | 1 | 2 | 4 | 4 |
| Intensity of odd taste | 0 | −1 | −3 | −3 | −3 |
| Intensity of saltiness | 0 | 0 | 0 | 1 | 2 |

[Example 2] Evaluation of Taste Quality Improvement Effect by Various High-Intensity Sweeteners and Sodium

[Example 2-1] Evaluation of Taste Quality Improvement Effect by Mogroside V and Sodium Experiment Method As in Example 1, natural sugars {sucrose (manufactured by Pacific Sugar Mfg. Co., Ltd.) and glucose (manufactured by Showa Sangyo Co., Ltd.)}, a high-intensity sweetener {mogroside V (MogV) (purity: 95% or more)}, and sodium gluconate were dissolved in a coffee extract liquid (a mixture of a coffee extract and a pH adjuster, caffeine content: 40 mg/100 ml, sodium content: 19 mg/100 ml) in the ratios shown in Table 4-1 below to prepare beverage samples. In addition, the solution not containing sodium gluconate was used as sample 2 (containing MogV). Incidentally, the Brix in Table 4-1 was calculated from the concentrations of the natural sugars, the sodium content in a beverage was calculated from the amount of sodium gluconate added and the sodium content derived from the coffee extract, and the energy (kcal/100 ml) was calculated by taking those derived from MogV and sodium as 0 (kcal/100 ml).

TABLE 4-1

| Content | Sample 2 | 2-1 |
| --- | --- | --- |
| Sucrose (w/v %) | 1.0 | 1.0 |
| Glucose (w/v %) | 3.5 | 3.5 |
| Brix (derived from sucrose + glucose) | 4.5 | 4.5 |
| MogV(ppm) | 208 | 208 |
| Sodium gluconate (g/L) | 0 | 1.90 |
| Sodium content in beverage sample (mg/100 ml) | 19 | 39 |
| Energy (Kcal/100 ml) | 18 | 18 |

The taste quality improvement effect by sodium was verified by sensory comparison of taste qualities of these beverage samples. The taste qualities as sensory evaluation items were "intensity of sweetness", "intensity of flavor (aroma)", "intensity of odd taste (such as bitter taste and astringent taste)", and "intensity of saltiness", and the evaluation was carried out by those (four persons) who received sensory training as panelists. Specifically, evaluation was performed as in Example 1, the "sensory evaluation score" calculated by each panelist was converted to a "converted score", and the total value of the converted scores of four panelists was calculated for each taste quality. In samples 2 and 2-1, the score of sample 2 was used as reference (0 point), and in samples 2A and 2-2, the score of sample 2A was used as reference (0 point).

Results

The results of the calculated total value of converted scores of each taste quality are shown in Table 4-2.

TABLE 4-2

| Taste quality | Sample 2 | 2-1 |
| --- | --- | --- |
| Intensity of sweetness | 0 | 5 |
| Intensity of flavor | 0 | 7 |
| Intensity of odd taste | 0 | −5 |
| Intensity of saltiness | 0 | 0 |

[Example 2-2] Evaluation of Taste Quality Improvement Effect by Rebaudioside M and Sodium Experiment Method As in Example 2-1, natural sugars {sucrose (manufactured by Pacific Sugar Mfg. Co., Ltd.) and glucose (manufactured by Showa Sangyo Co., Ltd.)}, a high-intensity sweetener {rebaudioside M (RebM) (purity: 99% or more)}, and sodium gluconate were dissolved in a coffee extract liquid (a mixture of a coffee extract and a pH adjuster, caffeine content: 40 mg/100 ml, sodium content: 19 mg/100 ml) in the ratios shown in Table 5-1 below to prepare beverage samples. In addition, the solution not containing sodium gluconate was used as sample 2A (containing RebM). Incidentally, the Brix in Table 5-1 was calculated from the concentrations of the natural sugars, the sodium content in a beverage was calculated from the amount of sodium gluconate added and the sodium content derived from the coffee extract, and the energy (kcal/100 ml) was calculated by taking those derived from RebM and sodium as 0 (kcal/100 ml).

TABLE 5-1

| Content | Sample 2A | 2-2 |
| --- | --- | --- |
| Sucrose (w/v %) | 1.0 | 1.0 |
| Glucose (w/v %) | 3.5 | 3.5 |
| Brix (derived from sucrose + glucose) | 4.5 | 4.5 |
| RebM (ppm) | 208 | 208 |
| Sodium gluconate (g/L) | 0 | 1.90 |
| Sodium content in beverage sample (mg/100 ml) | 19 | 39 |
| Energy (Kcal/100 ml) | 18 | 18 |

The taste quality improvement effect by sodium was verified by sensory comparison of taste qualities of these beverage samples. The taste qualities as sensory evaluation items were "intensity of sweetness", "intensity of flavor (aroma)", "intensity of odd taste (such as bitter taste and astringent taste)", and "intensity of saltiness", and the evaluation was carried out by those (four persons) who received sensory training as panelists. Specifically, evaluation was performed as in Example 1, the "sensory evaluation score" calculated by each panelist was converted to a "converted score", and the total value of the converted scores of four panelists was calculated for each taste quality. In samples 2A and 2-2, the score of sample 2A was used as reference (0 point).

Results

The results of the calculated total value of converted scores of each taste quality are shown in Table 5-2.

TABLE 5-2

| Taste quality | Sample 2A | 2-2 |
| --- | --- | --- |
| Intensity of sweetness | 0 | 6 |
| Intensity of flavor | 0 | 4 |
| Intensity of odd taste | 0 | 0 |
| Intensity of saltiness | 0 | 0 |

[Example 3] Evaluation of Taste Quality Improvement Effect by Coffee Beverage in Various Aspect and Sodium Experiment Method As in Example 1, natural sugars {sucrose (manufactured by Pacific Sugar Mfg. Co., Ltd.) and glucose (manufactured by Showa Sangyo Co., Ltd.)}, rebaudioside D (RebD) (purity: 95% or more), and sodium gluconate were dissolved in a coffee extract liquid (a coffee extract, caffeine content: 40 mg/100 ml, sodium amount: 5 mg/100 ml) in the ratios shown in Table 6 below to prepare beverage sample 3-1. The solution not containing sodium gluconate was used as sample 3. In addition, sample 4-1 was prepared by adding a milk component derived from cow's milk to sample 3-1, and a solution prepared by adding a milk component derived from cow's milk without adding sodium gluconate was used as sample 4.

Incidentally, the Brix in Table 6 was calculated from the concentrations of the natural sugars, the sodium content in a beverage was calculated from the concentration of sodium gluconate and the sodium content derived from the coffee extract and derived from the milk component, and the energy (kcal/100 ml) was calculated by taking the energy of components derived from RebD and sodium as 0 (kcal/100 ml).

TABLE 6

| Content | Sample 3 | 3-1 | Sample 4 | 4-1 |
| --- | --- | --- | --- | --- |
| Sucrose (w/v %) | 1.0 | 1.0 | 3.0 | 3.0 |
| Glucose (w/v %) | 3.5 | 3.5 | 0 | 0 |
| Brix (derived from sucrose + glucose) | 4.5 | 4.5 | 3.0 | 3.0 |
| RebD (ppm) | 208 | 208 | 208 | 208 |
| Sodium gluconate (g/L) | 0 | 1.90 | 0 | 1.90 |
| Milk component derived from cow's milk (g/L) | 0 | 0 | 80 | 80 |
| Sodium content in beverage Sample (mg/100 ml) | 5 | 25 | 40 | 60 |
| Energy (Kcal/100 ml) | 18 | 18 | 30 | 30 |

The taste quality improvement effect by sodium was verified by sensory comparison of taste qualities of these beverage samples. The taste qualities as sensory evaluation items were "intensity of sweetness", "intensity of flavor (aroma)", "intensity of odd taste (such as bitter taste and astringent taste)", and "intensity of saltiness", and the evaluation was carried out by those (four persons) who received sensory training as panelists. Specifically, evaluation was performed as in Example 1, the "sensory evaluation score" calculated by each panelist was converted to a "converted score", and the total value of the converted scores of four panelists was calculated for each taste quality.

Results

The results of the calculated total value of converted scores of each taste quality are shown in Table 7.

TABLE 7

| Taste quality | Sample 3 | 3-1 | Sample 4 | 4-1 |
| --- | --- | --- | --- | --- |
| Intensity of sweetness | 0 | 4 | 0 | 3 |
| Intensity of flavor | 0 | 4 | 0 | 4 |
| Intensity of odd taste | 0 | -2 | 0 | -5 |
| Intensity of saltiness | 0 | 0 | 0 | 0 |

[Example 4] Aroma Component Analysis by Gas Chromatography Experiment Method

As in Example 1, natural sugars {sucrose (manufactured by Pacific Sugar Mfg. Co., Ltd.) and glucose (manufactured by Showa Sangyo Co., Ltd.)}, rebaudioside D (RebD) (purity: 95% or more), and sodium gluconate were dissolved in a coffee extract liquid (a mixture of a coffee extract and a pH adjuster, caffeine content: 40 mg/100 ml, sodium content: 19 mg/100 ml) in the ratios shown in Table 8 below to prepare beverage samples. In addition, the solution not containing sodium gluconate was used as sample 5.

Incidentally, the Brix in Table 8 was calculated from the concentrations of the natural sugars, the sodium content in a beverage was calculated from the amount of sodium gluconate added and the sodium content derived from the coffee extract, and the energy (kcal/100 ml) was calculated by taking the energy derived from RebD and sodium as 0 (kcal/100 ml).

TABLE 8

| Content | Sample 5 | 5-1 |
| --- | --- | --- |
| Sucrose (w/v %) | 1.0 | 1.0 |
| Glucose (w/v %) | 3.5 | 3.5 |
| Brix (derived from sucrose + glucose) | 4.5 | 4.5 |
| RebD(ppm) | 208 | 208 |
| Sodium gluconate (g/L) | 0 | 1.90 |
| Sodium content in beverage sample (mg/100 ml) | 19 | 39 |
| Energy (Kcal/100 ml) | 18 | 18 |

Method for Collecting Sample for Aroma Component Analysis

About 50 ml of a beverage sample was placed in an impinger. While flowing clean nitrogen at a flow rate of 100 ml/min from one end of the impinger, the gas flowing into a sampling bag attached to the other end was collected for 10 minutes.

Apparatus and Analysis Conditions

The apparatus of gas chromatography mass spectrometry (TCT-GC/MS) analysis and the conditions of measurement were as follows:

Apparatus: TCT, manufactured by GL Sciences Inc., HP524;
Column: CP-SILSCB (0.25 mm I.D.×60 m, df=0.25 μm);
Column temperature: 40° C.→280° C. (10° C./min, hold);
Carrier gas: 1.0 ml/min;
Detector: GC/MS, manufactured by Agilent Technologies Japan, Ltd., 5977B model;
Ion source temperature: 230° C.;
Ionization method: EI; and
Measurement mass range: m/z 30 to 600.

The peaks obtained by analysis of sample 5-1 and sample 5 were compared with each other, and the area value of the peak appearance time 4.0 min judged as the peak of an aroma component was calculated. The results are shown in Table 9. The results demonstrated that an effect of improving the aroma is caused by adding sodium.

TABLE 9

| | Sample 5 | 5-1 |
| --- | --- | --- |
| Peak area value of peak appearance time 4.0 min | 64 | 71 |

INDUSTRIAL APPLICABILITY

The method of the present invention provides a method for increasing the sweetness of a coffee beverage or sweet composition, which is not a simple sweetness that is obtained by increasing the amounts of a natural sugar and a high-intensity sweetener used, and providing good taste.

The invention claimed is:

1. A coffee beverage comprising:
(a) a natural sugar in an amount corresponding to a sweetness intensity X1;
(b) a high-intensity sweetener in an amount corresponding to a sweetness intensity X2; and
(c) 25 mg/100 ml to 90 mg/100 ml of sodium,
wherein the high-intensity sweetener comprises at least one high-intensity sweetener b1 selected from the group consisting of rebaudioside M, rebaudioside D, rebaudioside N, rebaudioside O, rebaudioside E, and thaumatin; and $0.1 < (X1+X2) \leq 20$ is satisfied, and wherein the sweetness intensity X1 and X2 are obtained by multiplying a degree of sweetness of the natural sugar or high-intensity sweetener by the concentration Brix value of the natural sugar or high-intensity sweetener, when the degree of sweetness of sucrose per unit concentration Brix 1 is defined as a degree of sweetness of 1.

2. The coffee beverage according to claim 1, wherein a sodium content is 25 to 60 mg/100 ml.

3. The coffee beverage according to claim 1, wherein energy is 50 Kcal/100 ml or less.

4. The coffee beverage according to claim 1, wherein X1 is 0.1 to 5.9.

5. The coffee beverage according to claim 1, comprising 40 mg/100 ml to 100 mg/100 ml of caffeine.

6. The coffee beverage according to claim 1, wherein the natural sugar is at least one selected from the group consisting of glucose, sucrose, fructose, maltose, oligosaccharide, high-fructose corn syrup, lactose, psicose, allose, tagatose, and a combination thereof.

7. The coffee beverage according to claim 1, wherein the high-intensity sweetener is at least one selected from the group consisting of rebaudioside M, rebaudioside D, and a combination thereof.

8. The coffee beverage according to claim 1, wherein the sodium is at least one selected from the group consisting of sodium chloride, sodium hydroxide, sodium malate, sodium sulfate, sodium citrate, sodium phosphate, sodium carbonate, sodium disulfide, sodium bicarbonate, sodium alginate, sodium argininate, sodium glucoheptanoate, sodium gluconate, sodium glutamate, sodium tartrate, sodium aspartate, sodium lactate, sodium caseinate, sodium ascorbate, and a mixture thereof.

9. The coffee beverage according to claim 1,
wherein the coffee beverage comprises 25 to 40 mg/100 ml of sodium, energy is 50 Kcal/100 ml or less, and
wherein $6.0 \leq (X1+X2) \leq 20$ is satisfied.

10. The coffee beverage according to claim 1, which is packed in a container.

11. A method for producing a coffee beverage, comprising: to a raw material,
(i) adding (a) a natural sugar in an amount corresponding to a sweetness intensity X1 and (b) a high-intensity sweetener in an amount corresponding to a sweetness intensity X2; and
(ii) adding (c) sodium such that a sodium content in the beverage is 25 mg/100 ml to 90 mg/100 ml,
wherein the high-intensity sweetener comprises at least one high-intensity sweetener b1 selected from the group consisting of rebaudioside M, rebaudioside D, rebaudioside N, rebaudioside O, rebaudioside E, and thaumatin; and
$0.1 < (X1+X2) \leq 20$ is satisfied, and
wherein the sweetness intensity X1 and X2 are obtained by multiplying a degree of sweetness of the natural sugar or high-intensity sweetener by the concentration Brix value of the natural sugar or high-intensity sweetener, when the degree of sweetness of sucrose per unit concentration Brix 1 is defined as a degree of sweetness of 1.

12. The method according to claim 11, wherein in the coffee beverage, the sodium content is 25 to 60 mg/100 ml.

13. The method according to claim 11, wherein energy of the coffee beverage is 50 Kcal/100 ml or less.

14. The method according to claim 11, wherein X1 is 0.1 to 5.9.

15. The method according to claim 11, wherein the coffee beverage comprises 40 mg/100 ml to 100 mg/100 ml of caffeine.

16. The method according to claim 11, wherein the natural sugar is at least one selected from the group consisting of glucose, sucrose, fructose, maltose, oligosaccharide, high-fructose corn syrup, lactose, psicose, allose, tagatose, and a combination thereof.

17. The method according to claim 11, wherein the high-intensity sweetener is at least one selected from the group consisting of rebaudioside M, rebaudioside D, and a combination thereof.

18. The method according to claim 11, wherein the sodium is at least one selected from the group consisting of sodium chloride, sodium hydroxide, sodium malate, sodium sulfate, sodium citrate, sodium phosphate, sodium carbonate, sodium disulfide, sodium bicarbonate, sodium alginate, sodium argininate, sodium glucoheptanoate, sodium gluconate, sodium glutamate, sodium tartrate, sodium aspartate, sodium lactate, sodium caseinate, sodium ascorbate, and a mixture thereof.

19. The method according to claim 11,
wherein in the coffee beverage, the sodium content is 25 to 40 mg/100 ml, energy is 50 Kcal/100 ml or less, and
wherein $6.0 \leq (X1+X2) \leq 20$ is satisfied.

* * * * *